US008477712B2

(12) United States Patent
Hao et al.

(10) Patent No.: US 8,477,712 B2
(45) Date of Patent: Jul. 2, 2013

(54) METHOD FOR MAPPING PHYSICAL RANDOM ACCESS CHANNELS

(75) Inventors: Peng Hao, Shenzhen (CN); Bin Yu, Shenzhen (CN); Shuqiang Xia, Shenzhen (CN); Chunli Liang, Shenzhen (CN); Bo Dai, Shenzhen (CN)

(73) Assignee: ZTE Corporation, Shenzhen, Gunagdong Province (CN)

( * ) Notice: Subject to any disclaimer, the term of this patent is extended or adjusted under 35 U.S.C. 154(b) by 262 days.

(21) Appl. No.: 12/912,041

(22) Filed: Oct. 26, 2010

(65) Prior Publication Data

US 2011/0090863 A1 Apr. 21, 2011

Related U.S. Application Data

(63) Continuation of application No. PCT/CN2009/070392, filed on Feb. 10, 2009.

(30) Foreign Application Priority Data

Apr. 26, 2008 (CN) .......................... 2008 1 0094878

(51) Int. Cl.
*H04W 4/00* (2009.01)
*H04J 4/00* (2006.01)
*H04L 27/28* (2006.01)
(52) U.S. Cl.
USPC ........... 370/330; 370/343; 370/345; 370/436; 375/260
(58) Field of Classification Search
USPC ......... 370/204, 208, 280, 328–330, 336–337, 370/341–342, 343–348; 375/148, 260, 267, 375/296, 299, 347, 354–355
See application file for complete search history.

(56) References Cited

U.S. PATENT DOCUMENTS 7,061,890 B2 *   6/2006   Kim et al. ..................... 370/335
7,899,010 B2 *   3/2011   Choi et al. .................... 370/329

(Continued)

FOREIGN PATENT DOCUMENTS

CN    101166352 A    4/2008
CN    101179364 A    5/2008

(Continued)

OTHER PUBLICATIONS

International Preliminary Report and Written Opinion relating to corresponding PCT/CN2009/070392.

(Continued)

*Primary Examiner* — Tri H Phan
(74) *Attorney, Agent, or Firm* — Li & Cai Intellectual Property (USA) Office

(57) ABSTRACT

The present invention discloses a method for mapping physical random access channels, which comprises the following steps: the PRACHs in the same time domain location are mapped from low frequency to high frequency, or from high frequency to low frequency in usable frequency resource, wherein one PRACH occupies 6 resource blocks, and the frequency bands occupied by two adjacent PRACHs in the frequency domain do not overlap; or the PRACHs in the same time domain location are mapped from two sides to the middle in usable frequency resource, wherein one PRACH occupies 6 resource blocks, and the frequency bands occupied by two adjacent PRACHs in the frequency domain do not overlap. The present invention enables uniformly distributing the PRACHs which require to be processed by the same base station in the time domain, and decreasing the inter-cell interference of the second type PRACH to the utmost extent at the same time.

8 Claims, 5 Drawing Sheets

U.S. PATENT DOCUMENTS

| | | | |
|---|---|---|---|
| 7,912,133 B2* | 3/2011 | Cheon et al. | 375/240.27 |
| 8,180,354 B2* | 5/2012 | Li et al. | 455/447 |
| 2009/0010213 A1* | 1/2009 | Yamada et al. | 370/329 |
| 2009/0190534 A1* | 7/2009 | Yamada et al. | 370/328 |
| 2010/0232318 A1* | 9/2010 | Sarkar | 370/254 |
| 2011/0013542 A1* | 1/2011 | Yu et al. | 370/280 |
| 2011/0013546 A1* | 1/2011 | Hao et al. | 370/294 |
| 2011/0019752 A1* | 1/2011 | Hao et al. | 375/259 |
| 2011/0034177 A1* | 2/2011 | Oh et al. | 455/450 |
| 2012/0044922 A1* | 2/2012 | Ishii | 370/338 |

FOREIGN PATENT DOCUMENTS

| | | |
|---|---|---|
| CN | 101247658 A | 8/2008 |
| CN | 101267679 A | 9/2008 |
| WO | 2007/045504 A1 | 4/2007 |
| WO | 2007/052972 A1 | 5/2007 |

OTHER PUBLICATIONS

International Search Report relating to corresponding PCT/CN2009/070392.
English Abstract of CN 101179364.
English Abstract of CN 101267679.
English Abstract of CN 101247658.
English Abstract of CN 101166352.
Sun, et al., "An Adaptive Random Access Protocol for OFDMA System," Technology Conference, 2007, VTC-2007—Fall. 2007 IEEE 66th., Oct. 3, 2007, pp. 1827-1831.

* cited by examiner

METHOD FOR MAPPING PHYSICAL RANDOM ACCESS CHANNELS

RELATED APPLICATIONS

This application is a continuation of PCT application number PCT/CN2009/070392 designating the United States and filed Feb. 10, 2009; which claims the benefit of CN patent application number 200810094878.0 and filed Apr. 26, 2008 both of which are hereby incorporated by reference in their entireties.

FIELD OF THE INVENTION

The present invention relates to communication field, and in particular to a method for mapping physical random access channel.

BACKGROUND OF THE INVENTION

FIG. 1 is a schematic diagram of the frame structure of time division duplex (TDD) mode in the LTE system. As shown in FIG. 1, in such a frame structure, a 10 ms (307200 Ts, 1 ms=30720 Ts) radio frame is divided into two half frames, each of which is 5 ms (153600 Ts) long and comprises 8 normal time slots which a length of 0.5 ms and three special time slots, i.e., a downlink pilot time slot (DwPTS), a guard period (GP) and an uplink pilot time slot (UpPTS), and the total length of the three special time slots is 1 ms (30720 Ts). Subframe 1 is always consisted of three special time slots; when there are two downlink to uplink switch points in 10 ms, subframe 6 is consisted of three special time slots; in other cases, subframe 6 only comprises a DwPTS (the length of the DwPTS is 1 ms at this time); and other subframes are consisted of 2 normal time slots.

In the above mentioned frame structure, subframe 0, 5 and the DwPTS are used for downlink transmission, the subframe 2 and the UpPTS are used for uplink transmission. When there are 2 downlink-to-uplink switch points in 10 ms, subframe 7 is also used for uplink transmission.

The physical random access channel (PRACH) of TDD mode in the LTE system can be classified into two types:

The first type is transmitted in general uplink subframes (not including subframes of special time slots), and comprises 4 kinds of PRACHs as listed below:

(1) Preamble format 0: occupying 1 uplink subframes; the length of the cyclic prefix (CP) being 3168 Ts; and the length of the preamble being 24576 Ts;

(2) Preamble format 1: occupying 2 uplink subframes; the length of the CP (Cyclic Prefix) being 21024 Ts; and the length of the preamble being 24576 Ts;

(3) Preamble format 2: occupying 2 uplink subframes; the length of the CP being 6240 Ts; and the length of the preamble being 2×24576 Ts;

(4) Preamble format 3: occupying 3 uplink subframes; the length of the CP being 21024 Ts; and the length of the preamble being 2×24576 Ts;

The second type is transmitted in the UpPTS and comprises one kind of PRACH, Preamble format 4, of which the length of the CP is 448 Ts and the length of the preamble is 4096 Ts;

In the frequency domain, all of the various PRACHs mentioned above occupy 6 resource blocks (RB); each RB comprises 12 sub-carriers, and each sub-carrier has a bandwidth of 15 kHz.

Upon accessing a system, a mobile telephone needs to perform downlink synchronization, and then demodulate the broadcast channel to obtain the configuration parameters of the PRACH, finally perform uplink synchronization through the PRACH, and establish a link to the base station. Wherein, the configuration parameters of the PRACH in the TDD mode comprises density (how many PRACHs are usable in a unit of time, e.g. density D=2 PRACH/10 ms, which means that there are 2 PRACHs usable in 10 ms), preamble format, and version number. Wherein same format, density with different version number means that preamble format are the same, the number of PRACH in a unit of time are the same, but the locations of these PRACHs in the frequency domain or time domain are different. The purpose that a plurality of versions are set for the PRACHs of the same format and same density and different cells use different versions is to scatter the PRACHs of different cells managed by the same base station in the time domain, so as to make individual cells managed by the same base station in the time domain, so as to make individual cells managed by the same base station request for processing PRACHs at different time as much as possible, thus avoid the case that the base station is over busy at some time but has no data to process at other time. In addition, for the PRACH of preamble format 4, since no data is sent in the UpPTS, different cells use different versions, the PRACH of each cell has different time domain or frequency domain location, which can reduce the inter-cell interference of the PRACH.

During the process of uplink synchronization, the mobile telephone obtains the time domain locations and frequency domain location of the PRACHs usable for the present cell using the PRACH configuration parameters by a certain algorithm. In the prior art, no reasonable mapping algorithm for the time domain location and the frequency domain location is provided, which results in problems that the PRACHs which need to be processed by the same base station are distributed unevenly in the time domain, and inter-cell interference of the PRACH of the second type is comparatively severe.

SUMMARY OF THE INVENTION

The present invention is proposed in consideration that there is no reasonable mapping algorithm for the frequency domain location in the prior art, which results in the problem that the PRACHs which need to be processed by the same base station are distributed unevenly in the time domain, and the inter-cell interference of the second type of the PRACH is comparatively severe. For this reason, the present invention aims at providing a mapping method for the PRACHs to solve at least one of above mentioned problems.

In the embodiment of the present invention, the present invention provides a method for mapping physical random access channel. The method comprises the following steps: the PRACHs in the same time domain location are mapped from low frequency to high frequency, or from high frequency to low frequency in usable frequency resource, one PRACH occupies 6 serial resource blocks, and the frequency bands occupied by the two adjacent PRACHs in the frequency domain do not overlap; or the PRACHs in the same time domain location are mapped from two sides to the middle in usable frequency resource, one PRACH occupies 6 serial resource blocks, and the frequency bands occupied by the two adjacent PRACHs in the frequency domain do not overlap.

Preferably, there are W PRACHs belongs to the same cell which have the version number r and are in the same time domain location, the serial number of the W PRACHs are respectively w=0, 1, 2, ..., W−1. The step of mapping the W PRACHs which have the same time domain location. and same version number from two sides to the middle in usable frequency resource specifically comprises: if w is an even number, the PRACHs are mapped from high frequency to low frequency in usable frequency resource according to sequence of the W from small to big or from big to small, and if w is odd number, the PRACHs are mapped from low frequency to high frequency in usable frequency resource according to sequence of the w from small to big or from big to small; or, if w is even number, the PRACHs are mapped from low frequency to high frequency in usable frequency resource according to sequence of the w from small to big or from big to small, and if w is an odd number, the PRACHs are mapped from high frequency to low frequency in usable frequency resource according to sequence of the w from small to big or from big to small; or, the first half PRACHs are mapped from high frequency to low frequency in usable frequency resource according to sequence of the w from small to big or from big to small, and the second half PRACHs are mapped from low frequency to high frequency in usable frequency resource according to sequence of the w from small to big or from big to small; or, the first half PRACHs are mapped from low frequency to high frequency in usable frequency resource according to sequence of the w from small to big or from big to small, and the second half PRACHs are mapped from high frequency to low frequency in usable frequency resource according to sequence of the w from small to big or from big to small, wherein, the PRACHs $$w \le \left\lceil \frac{W}{2} \right\rceil \text{ or } w < \left\lceil \frac{W}{2} \right\rceil$$

or $$w \le \left\lfloor \frac{W}{2} \right\rfloor \text{ or } w < \left\lfloor \frac{W}{2} \right\rfloor$$

are taken as the first half, and the rest PRACHs are taken as the second half.

Preferably, the step of mapping PRACHs from low frequency to high frequency or from high frequency to low frequency in usable frequency resource specifically comprises: for the PRACHs which belong to the same cell, which have the version number r and are in the same time domain location, under the condition that one radio frame has two uplink pilot time slots, in the uplink subframe or uplink pilot time slot or the subframe comprising the uplink pilot time slot in the first half frame, the PRACHs are mapped from low frequency to high frequency in usable frequency band; in the uplink subframe or uplink pilot time slot in the second half frame, the PRACHs are mapped from high frequency to low frequency in usable frequency band; and all of the radio frames adopt the same method; or, in the uplink subframe or uplink pilot time slot or the subframe comprising the uplink pilot time slot in the first half frame, the PRACHs are mapped from high frequency to low frequency in usable frequency band; in the uplink subframe or uplink pilot time slot in the second half frame, the PRACHs are mapped from low frequency to high frequency in usable frequency band; and all of the radio frames adopt the same method; under the condition that one radio frame has one uplink pilot time slot, in the uplink subframe or uplink pilot time slot or the subframe comprising the uplink pilot time slot of even numbered radio frames, the PRACHs are mapped from low frequency to high frequency in usable frequency band; in the uplink subframe or uplink pilot time slot or the subframe comprising the uplink pilot time slot of odd numbered radio frames, the PRACHs are mapped from high frequency to low frequency in usable frequency band; or in the uplink subframe or uplink pilot time slot or the subframe comprising the uplink pilot time slot of odd numbered radio frames, the PRACHs are mapped from low frequency to high frequency in usable frequency band; in the uplink sub-frame of even numbered radio frames, the PRACHs are mapped from high frequency to low frequency in usable frequency band; or in the uplink subframes or uplink pilot time slots or the subframes comprising the uplink pilot time slot of all radio frames, the PRACHs are mapped from low frequency to high frequency in usable frequency band; or in the uplink subframes or uplink pilot time slots or the subframes comprising the uplink pilot time slot of all radio frames, the PRACHs are mapped from high frequency to low frequency in usable frequency band; or in the uplink subframes or uplink pilot time slots or the subframes comprising the uplink pilot time slot of all radio frames, the PRACHs are mapped from two sides to the middle in usable frequency band.

Preferably, the method also comprises the step of obtaining the version number r during using a mapping algorithm. The step specifically comprises: the version number r is obtained directly through the configuration type transmitted by the base station; or cell number $N_{ID}^{cell}$ is obtained, version number $r = N_{ID}^{cell} \mod R$ is set, and $r \in [0, R-1]$.

Preferably, the frequency domain mapping formula for performing mapping in the frequency domain is:

$$k_{RA} = \begin{cases} k'_{RA} + 6 \left\lfloor \frac{f_{RA}^r(t_{RA}^0, t_{RA}^1, t_{RA}^2)}{2} \right\rfloor, & f_{RA}^r(t_{RA}^0, t_{RA}^1, t_{RA}^2) \mod 2 = 0 \\ N_{RB}^{UL} - 6 - k'_{RA} - 6 \left\lfloor \frac{f_{RA}^r(t_{RA}^0, t_{RA}^1, t_{RA}^2)}{2} \right\rfloor, & \text{otherwise} \end{cases}$$

Wherein, $k_{RA}$ denotes the first usable frequency domain resource block of a certain PRACH, and $k_{RA} \in [0, N_{RB}^{UL}-6]$, $N_{RB}^{UL}$ is the total number of uplink resource blocks; $f_{RA}^r(t_{RA}^0, t_{RA}^1, t_{RA}^2)$ denotes the frequency domain mapping index of the PRACHs, and $f_{RA}^r(t_{RA}^0, t_{RA}^1, t_{RA}^2) = 0, 1, 2, \ldots, N_{RA}^r(t_{RA}^0, t_{RA}^1, t_{RA}^2)-1$; its meaning is the serial numbers of all PRACHs belonging to the same cell, with the version number r and the same time domain location which is determined by the parameter $(t_{RA}^0, t_{RA}^1, t_{RA}^2)$; $k'_{RA}$ is the serial number of the first resource block which can be used by the PRACHs in the low frequency, $k'_{RA} \in [0, N_{RB}^{UL}-6]$; $N_{RA}^r(t_{RA}^0, t_{RA}^1, t_{RA}^2)$ is the number of all the PRACHs belonging to the same cell, with the version number r and the same time domain location which is determined by the parameter $(t_{RA}^0, t_{RA}^1, t_{RA}^2)$; $N_{RB}^{UL}$ denotes the total number of the resource blocks corresponding to uplink bandwidth; $t_{RA}^0$ used to indicate which radio frame the PRACH resides; $t_{RA}^1$ is used to indicate in which half frame the PRACH is resides; $t_{RA}^2$ is used to indicate in which subframe in the half frame the PRACH resides.

For the preamble format 4 PRACH, preferably, the frequency domain mapping formula for performing mapping in the frequency domain is one of the following formulas:

$$k_{RA} = \begin{cases} k'_{RA} + 6 f_{RA}^r(t_{RA}^0, t_{RA}^1, t_{RA}^2), & \text{if } \left( \frac{(SFN \mod 2) \cdot}{(2 - N_{SP}) + t_{RA}^1} \right) \mod 2 = 0 \\ N_{RB}^{UL} - k'_{RA} - 6 - 6 f_{RA}^r(t_{RA}^0, t_{RA}^1, t_{RA}^2), & \text{otherwise;} \end{cases}$$

-continued $$k_{RA} = \begin{cases} k'_{RA} + 6f^r_{RA}(t^0_{RA}, t^1_{RA}, t^2_{RA}), & \text{if } ((SFN\bmod 2) + t^1_{RA})\bmod 2 = 0 \\ N^{UL}_{RB} - k'_{RA} - 6 - 6f^r_{RA}(t^0_{RA}, t^1_{RA}, t^2_{RA}), & \text{otherwise;} \end{cases}$$

$$k_{RA} = \begin{cases} k'_{RA} + 6f^r_{RA}(t^0_{RA}, t^1_{RA}, t^2_{RA}), & \text{if } t^1_{RA}\bmod 2 = 0 \\ N^{UL}_{RB} - k'_{RA} - 6 - 6f^r_{RA}(t^0_{RA}, t^1_{RA}, t^2_{RA}), & \text{otherwise;} \end{cases}$$

When $N_{SP} = 2$, $$k_{RA} = \begin{cases} k'_{RA} + 6f^r_{RA}(t^0_{RA}, t^1_{RA}, t^2_{RA}), & \text{if } t^1_{RA}\bmod 2 = 0 \\ N^{UL}_{RB} - k'_{RA} - 6 - 6f^r_{RA}(t^0_{RA}, t^1_{RA}, t^2_{RA}), & \text{otherwise;} \end{cases}$$

When $N_{SP} = 1$, $$k_{RA} = \begin{cases} k'_{RA} + 6\left\lfloor \frac{f^r_{RA}(t^0_{RA}, t^1_{RA}, t^2_{RA})}{2} \right\rfloor, & f^r_{RA}(t^0_{RA}, t^1_{RA}, t^2_{RA})\bmod 2 = 0 \\ N^{UL}_{RB} - 6 - k'_{RA} - 6\left\lfloor \frac{f^r_{RA}(t^0_{RA}, t^1_{RA}, t^2_{RA})}{2} \right\rfloor, & \text{otherwise;} \end{cases}$$

Wherein, $k_{RA}$ the first usable frequency domain resource block of a certain PRACH, and $k_{RA} \in [0, N_{RB}^{UL}-6]$, $N_{RB}^{UL}$ is the total number of uplink resource blocks; $f_{RA}^{r}(t_{RA}^0, t_{RA}^1, t_{RA}^2)$ is the frequency domain mapping index of the PRACH, and $f_{RA}^{r}(t_{RA}^0, t_{RA}^1, t_{RA}^2)=0, 1, 2, \ldots, N_{RA}^{r}(t_{RA}^0, t_{RA}^1, t_{RA}^2)-1$; its meaning is the serial numbers of all the PRACHs belong to the same cell which have the version number r and are in the same time domain location determined by the parameter $(t_{RA}^0, t_{RA}^1, t_{RA}^2)$; $k'_{RA}$ is the serial number of the first resource block which can be used by the PRACHs in the low frequency, $k'_{RA} \in [0, N_{RB}^{UL}-6]$; $N_{RA}^{r}(t_{RA}^0, t_{RA}^1, t_{RA}^2)$ is the number of all the PRACHs which have the version number r and are in the same time domain location determined by the parameter $(t_{RA}^0, t_{RA}^1, t_{RA}^2)$; wherein, $N_{RB}^{UL}$ denotes the total number of the RBs corresponding to uplink bandwidth; $N_{SP}$ is the number of the switch points from downlink to uplink in one radio frame; $t_{RA}^0$ is used to indicate in which radio frame the PRACH resides; $t_{RA}^1$ is used to indicate in which half frame the PRACH resides, $t_{RA}^1$ equals to 0 or 1 which respectively represents the PRACH is in the first half frame or the second half frame of the radio frame, therefore, $t_{RA}^1$ mod 2=0 is equivalent to $t_{RA}^1=0$, and $t_{RA}^1$ mod 2=1 is equivalent to $t_{RA}^1=1$; $t_{RA}^2$ used to indicate in which subframe in the half frame the PRACH resides; SFN is the system frame number or is known as the radio frame number.

Preferably, the frequency domain mapping formulas for performing mapping in the frequency domain are:

For preamble format 0-3, $$k_{RA} = \begin{cases} k'_{RA} + 6\left\lfloor \frac{f^r_{LRA}(t^0_{RA}, t^1_{RA}, t^2_{RA})}{2} \right\rfloor, & \text{if } f^r_{LRA}(t^0_{RA}, t^1_{RA}, t^2_{RA})\bmod 2 = 0 \\ N^{UL}_{RB} - k'_{RA} - 6 - 6\left\lfloor \frac{f^r_{LRA}(t^0_{RA}, t^1_{RA}, t^2_{RA})}{2} \right\rfloor, & \text{otherwise;} \end{cases}$$

For preamble format 4, $$k_{RA} = \begin{cases} k'_{RA} + 6\left\lfloor \frac{f_{SRA}}{2} \right\rfloor, & \text{if } f_{SRA}\bmod 2 = 0 \\ N^{UL}_{RB} - 6 - k'_{RA} - 6\left\lfloor \frac{f_{SRA}}{2} \right\rfloor, & \text{otherwise,} \end{cases}$$

wherein $f_{SRA} = \left\lfloor \frac{N'^{ind}_{RA}}{\sum_{i=0}^{N_{SP}-1} N^{HF}_{RA}(i)} \right\rfloor$;

Or
For preamble format 0-3, $$k_{RA} = \begin{cases} k'_{RA} + 6\left\lfloor \frac{f^r_{LRA}(t^0_{RA}, t^1_{RA}, t^2_{RA})}{2} \right\rfloor, & \text{if } f^r_{LRA}(t^0_{RA}, t^1_{RA}, t^2_{RA})\bmod 2 = 0 \\ N^{UL}_{RB} - k'_{RA} - 6 - 6\left\lfloor \frac{f^r_{LRA}(t^0_{RA}, t^1_{RA}, t^2_{RA})}{2} \right\rfloor, & \text{otherwise;} \end{cases}$$

For preamble format 4, $$k_{RA} = \begin{cases} k'_{RA} + 6\left\lfloor \frac{f_{SRA}}{2} \right\rfloor, & \text{if } f_{SRA}\bmod 2 = 0 \\ N^{UL}_{RB} - \left\lfloor \frac{N_{SRA}}{2} \right\rfloor - k'_{RA} + 6\left\lfloor \frac{f_{SRA}}{2} \right\rfloor, & \text{otherwise,} \end{cases}$$

wherein $f_{SRA} = \left\lfloor \frac{N'^{ind}_{RA}}{\sum_{i=0}^{N_{SP}-1} N^{HF}_{RA}(i)} \right\rfloor$;

Wherein, $k_{RA}$ denotes the first usable frequency domain resource block of a certain PRACH, and $k_{RA}[0, N_{RB}^{UL}-6]$, $N_{RB}^{UL}$ is the total number of uplink resource blocks; $\alpha=(2D)$ mod 2; $f_{RA}^{r}(t_{RA}^0, t_{RA}^1, t_{RA}^2)$ is the frequency domain mapping index of the PRACHs, and $f_{RA}^{r}(t_{RA}^0, t_{RA}^1, t_{RA}^2)=0, 1, 2, \ldots, N_{RA}^{r}(t_{RA}^0, t_{RA}^1, t_{RA}^2)-1$; its meaning is the serial numbers of all the PRACHs belong to the same cell which have the version number r and are in the same time domain location determined by the parameter $(t_{RA}^0, t_{RA}^1, t_{RA}^2)$; $k'_{RA}$ denotes the location of the first resource block (RB) which can be used by the PRACHs in the low frequency, $k'_{RA} \in [0, N_{RB}^{UL}-6]$; $N_{RA}^{r}(t_{RA}^0, t_{RA}^1, t_{RA}^2)$ is the number of all the PRACHs which have the version number r and are in the same time domain location determined by the parameter $(t_{RA}^0, t_{RA}^1, t_{RA}^2)$; $N_{sub-frame}^{UL,HF}(i)$ is the number of uplink subframes in a half frame; wherein for the preamble format 4, L=1, $N_{sub-frame}^{UL,HF}(i)$ is the number of uplink pilot time slot in a half frame; i=0 refers to the first half frame, and i=1 refers to the second half frame, and $$N^{HF}_{RA}(i) = \left\lfloor \frac{N^{UL,HF}_{sub-frame}(i)}{L} \right\rfloor;$$

$N_{SP}$ is the number of the switch points from downlink to uplink; $t_{RA}^0=0$, 1 or 2 which respectively represents that the PRACH is in each radio frame, in an even numbered radio frames or in an odd numbered radio frames; $t_{RA}^1=0$ or 1 which respectively represents that the PRACH is in the first half frame or the second half frame of the radio frame; therefore, $t_{RA}^1$ mod 2=0 is equivalent to $t_{RA}^1=0$, and $t_{RA}^1$ mod 2=1 is equivalent to $t_{RA}^1=1$; $t_{RA}^2$ is used to indicate in which subframe in the half frame the PRACH resides; SFN is the system frame number or is known as the radio frame number.

In virtue of at least one of above mentioned technical schemes, through considering the version number factor during mapping, the present invention overcomes the problems that the PRACHs processed by the same base station are non-uniformly distributed in the time domain and so on, enables uniformly distributing the PRACHs which require to be processed by the same base station in the time domain, and decreasing the inter-cell interference of the second type PRACH to the utmost extent at the same time.

BRIEF DESCRIPTION OF THE DRAWINGS

The drawings are provided herein for the further understanding of the present invention, and form a part of the present application, and the exemplary embodiments and the description are used to explain the present invention, which dose not form an undue limitation to the present invention, wherein.

DETAILED DESCRIPTION

Functions Summary

Figure 1:
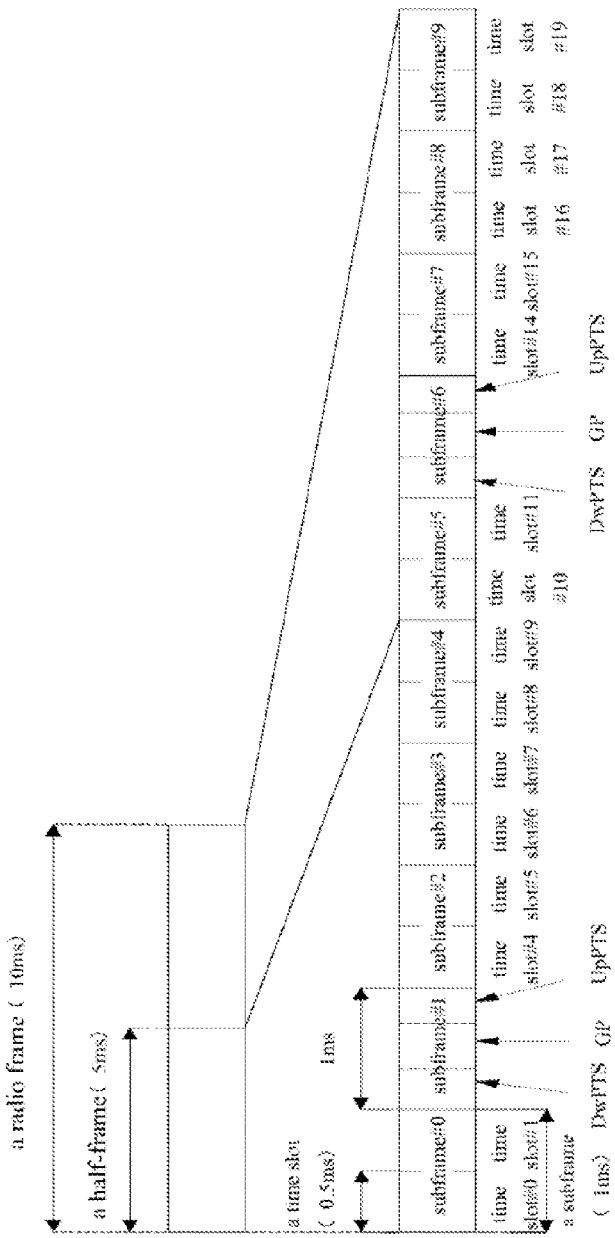
FIG. 1 shows the frame structure of the TDD mode in the LTE system.

In the technical method provided by the embodiment of the present invention, the PRACHs with the same version number r are mapped from low frequency to high frequency, or from high frequency to low frequency in usable frequency resource, wherein one PRACH occupies 6 resource blocks, and the frequency bands occupied by two adjacent PRACHs in the frequency domain do not overlap with each other; the same mapping process is adopted for each version number r; the PRACHs with the same version number r are mapped from two sides to the middle in usable frequency resource, wherein one PRACH occupies 6 resource blocks, and the frequency bands occupied by two adjacent PRACHs in the frequency domain do not overlap with each other; the same mapping process is adopted for each version number r.

By referring to drawings and in connection with embodiments. The present invention will be described in detail. It needs to be explained that, if not contradictory, the embodiments of the present invention and the features of the embodiments can be combined with one another.

The method for mapping PRACHs according to the embodiments of the present invention comprises the following steps: the PRACHs in the same time domain location is mapped from low frequency to high frequency, or from high frequency to low frequency in usable frequency resource, wherein one PRACH occupies 6 resource blocks, and the frequency bands occupied by two adjacent PRACHs in the frequency domain do not overlap with each other; or the PRACHs in the same time domain location is mapped from two sides to the middle in usable frequency resource, wherein one PRACH occupies 6 resource blocks, and the frequency bands occupied by two adjacent PRACHs in the frequency domain do not overlap. The same mapping process is adopted for each version number r.

In consideration of the version number factor during mapping, the present invention overcomes the problems that the PRACHs processed by the same base station are non-uniformly distributed in the time domain and so on, enables uniformly distributing the PRACHs which require to be processed by the same base station in the time domain, and decreasing the inter-cell interference of the second type PRACH to the utmost extent at the same time.

In order to describe the present invention still better, the present invention gives the following definition which is not used to restrict the present invention.

Frequency domain mapping: if one PRACH occupies L uplink subframes in the time domain, the PRACHs mapped into the L uplink subframes are mapped in the frequency domain (for preamble format 4, the uplink sub-frame means the UpPTS).

Method 1

The PRACHs are mapped from low frequency to high frequency or from high frequency to low frequency in usable frequency resource according to the serial number (1V) from small to big or from big to small, one PRACH occupies 6 RBs, and the frequency bands occupied by two adjacent PRACHs in the frequency domain do not overlap.

Method 2

The PRACHs are mapped from two sides to the middle in usable frequency resource according to the serial number ($N_{ind}^{RA}$) from small to big or from big to small, one PRACH occupies 6 RBs, and the frequency bands occupied by two adjacent PRACHs in the frequency domain do not overlap.

Method 3

In the frequency domain resource which can be used for transmitting the PRACHs, the PRACHs with the same version number r are mapped from low frequency to high frequency, or from high frequency to low frequency, one PRACH occupies 6 resource blocks, and the frequency bands occupied by two adjacent PRACHs in the frequency domain do not overlap. The same mapping process is adopted for each version number r.

For example, $N_{ind}^{RA}$=0, 4, 6, 8, wherein 0 and 6 correspond to the same version number r, 4 and 8 correspond to the same version number r. 0 and 6 are mapped from low frequency to high frequency, and 4 and 8 are also mapped from low frequency to high frequency. Finally, 0 and 4 have the same frequency domain location, and 6 and 8 have the same frequency domain location.

Method 4

The PRACHs with the same version number r are mapped from two sides to the middle in the frequency domain resource which can be used for transmitting the PRACHs.

If the PRACHs are mapped into the L subframes, if the number of the PRACHs with the same version number r is W, and the serial numbers of the PRACHs are w=0, 1, 2, . . . , W−1, the mapping method is:

If w is an even number, the PRACHs are mapped from high frequency (or low frequency) to low frequency (or high frequency) in usable frequency band; if w is an odd number, the PRACHs are mapped from low frequency (or high frequency) to high frequency (or low frequency) in usable frequency band; one PRACH occupies 6 resource blocks, and the frequency bands occupied by two adjacent PRACHs in the frequency domain do not overlap. The same mapping process is adopted for each version number r; or, The first half $$\left(w \le \left\lceil \frac{W}{2} \right\rceil \text{ or } w < \left\lceil \frac{W}{2} \right\rceil \text{ or } w \le \left\lfloor \frac{W}{2} \right\rfloor \text{ or } w < \left\lfloor \frac{W}{2} \right\rfloor \right)$$

PRACHs are mapped from high frequency (or low frequency) to low frequency (or high frequency) in usable frequency band; and the second half of the PRACHs are mapped from low frequency (or high frequency) to high frequency (or low frequency) in usable frequency band; one PRACH occupies 6 resource blocks, and the frequency bands occupied by two adjacent PRACHs in the frequency domain do not overlap. The same mapping process is adopted for each version number r.

For example, if the format of the PRACH is the preamble format 0, then L=1, and the PRACHs which have the indexes $N_{ind}^{RA}$=0, 4, 6, 8, 9, 10 are mapped into certain uplink subframe, wherein 0, 4, 6 correspond to the same version number r=0, and 8, 9, 10 correspond to the same version number r=1. For r=0, w=0, 1, 2 correspond to 0, 4, 6; and for r=1, w=0, 1, 2 correspond to 8, 9, 10. If w is odd number, the PRACHs are mapped from low frequency to high frequency in usable frequency band; if w is an odd number, the PRACHs are mapped from high frequency to low frequency in usable frequency band. The mapping result is as shown in FIG. 12, wherein the PRACHs with the $N_{ind}^{RA}$=0, 8 have the same frequency domain location; the PRACHs with the $N_{ind}^{RA}$=4, 9 have the same frequency domain location; and the PRACHs with the $N_{ind}^{RA}$=6, 10 have the same frequency domain location.

Method 5

The PRACHs are mapped from two sides to the middle in usable frequency resource according to the $N_{ind}^{RA}$ from small to big or from big to small. For example, the W PRACHs mapped into the L subframes are renumbered w=0, 1, 2, . . . , W−1 according to the $N_{ind}^{RA}$ from small to big or from big to small. The mapping method is:

If w is an even number, the PRACHs are mapped from high frequency (or low frequency) to low frequency (or high frequency) in usable frequency band according to the w from small to big or from big to small; if w is an odd number, the PRACHs are mapped from low frequency (or high frequency) to high frequency (or low frequency) in usable frequency band according to the w from small to big or from big to small; one PRACH occupies 6 resource blocks, and the frequency bands occupied by two adjacent PRACHs in the frequency domain do not overlap; or, The first half $$\left(w \le \left\lceil \frac{W}{2} \right\rceil \text{ or } w < \left\lceil \frac{W}{2} \right\rceil \text{ or } w \le \left\lfloor \frac{W}{2} \right\rfloor \text{ or } w < \left\lfloor \frac{W}{2} \right\rfloor \right)$$

PRACHs are mapped from high frequency (or low frequency) to low frequency (or high frequency) in usable frequency band according to sequence of the w from small to big or from big to small; and the second half PRACHs are mapped from low frequency (or high frequency) to high frequency (or low frequency) in usable frequency band according to sequence of the w from small to big or from big to small; wherein one PRACH occupies 6 resource blocks, and the frequency bands occupied by two adjacent PRACHs in the frequency domain do not overlap with each other.

Method 6

All the PRACHs mapped into one uplink subframe or the UpPTS are mapped from low frequency to high frequency or from high frequency to low frequency in usable frequency resource, and the uplink subframes or the UpPTSs on the two adjacent fields adopt different mapping sequences. One PRACH occupies 6 resource blocks, and the frequency bands occupied by two adjacent PRACHs in the frequency domain do not overlap. The same mapping process is adopted for each version number r. The mapping method specifically is:

In an even numbered radio frames, the uplink subframes or UpPTSs of the first half frame are mapped from low frequency to high frequency in usable frequency band; the uplink subframes or UpPTSs of the second half frame are mapped from high frequency to low frequency in usable frequency band. In an odd numbered radio frames, the uplink subframes or UpPTSs of the first half frame are mapped from high frequency to low frequency in usable frequency band; the uplink subframes or UpPTSs of the second half frame are mapped from low frequency to high frequency in usable frequency band. Or, In an odd numbered radio frames, the uplink subframes or UpPTSs of the first half frame are mapped from low frequency to high frequency in usable frequency band; the uplink sub-frames or UpPTSs of the second half frame are mapped from high frequency to low frequency in usable frequency band. In an even numbered radio frames, the uplink subframes or UpPTSs of the first half frame are mapped from high frequency to low frequency in usable frequency band; the uplink subframes or UpPTSs of the second half frame are mapped from low frequency to high frequency in usable frequency band. Or, Perform the mapping according to the number of the UpPTS in one radio frame, including two situations as follows:

The first situation: one radio frame has two UpPTSs.

In the uplink subframe or UpPTS or the subframe comprising the UpPTS of the first half frame, the PRACHs are mapped from low frequency to high frequency in usable frequency band; in the uplink subframe or UpPTS of the second half frame, the PRACHs are mapped from high frequency to low frequency in usable frequency band. All radio frames adopt the same mapping method; or, In the uplink subframe or UpPTS or the subframe comprising the UpPTS of the first half frame, the PRACHs are mapped from high frequency to low frequency in usable frequency band; in the uplink subframe or UpPTS of the second half frame, the PRACHs are mapped from low frequency to high frequency in usable frequency band. All radio frames adopt the same mapping method.

The second situation: one radio frame has one UpPTS.

In the uplink subframe or UpPTS or the subframe comprising the UpPTS of even numbered radio frames, the PRACHs are mapped from low frequency to high frequency in usable frequency band; in the uplink subframe or UpPTS of odd numbered radio frames, the PRACHs are mapped from high frequency to low frequency in usable frequency band; or In the uplink subframe or UpPTS or the subframe comprising the UpPTS of odd numbered radio frames, the PRACHs are mapped from low frequency to high frequency in usable frequency band; in the uplink subframe or UpPTS of even numbered radio frames, the PRACHs are mapped from high frequency to low frequency in usable frequency band; or In the uplink subframe or UpPTS or the subframe comprising the UpPTS of all the radio frame, the PRACHs are mapped from low frequency to high frequency in usable frequency band; or In the uplink subframe or UpPTS or the subframe comprising the UpPTS of all the radio frame, the PRACHs are mapped from high frequency to low frequency in usable frequency band; or In the uplink subframes or uplink pilot time slots or the subframes comprising the UpPTS of all radio frames, the PRACHs are mapped from two sides to the middle in usable frequency band.

Figure 2:
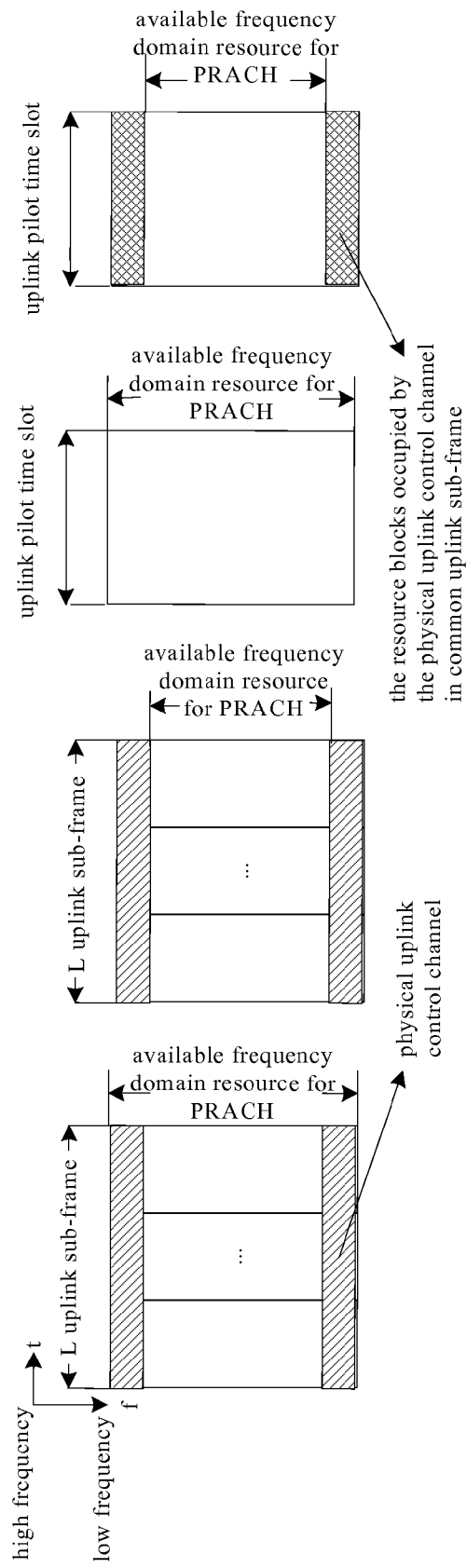
FIG. 2 shows a schematic diagram of usable frequency resource.

For common uplink subframes, the usable frequency domain resource of the PRACH refers to all usable frequency domain resource of current system except the frequency resource occupied by the physical downlink control channel (PUCCH), or all usable frequency domain resource of current system; for the UpPTS, the usable frequency domain resource of the PRACH refers to all usable frequency domain resource of current system, or all usable frequency domain resource except the frequency resource occupied by the PUCCH of common uplink subframe. FIG. 2 is a schematic diagram of usable frequency resource, as shown in FIG. 2:

The base station notifies the density D directly to the mobile telephone through the control signaling of the PRACH;

The version number R can be obtained in three ways:

Through the PRACH configuration type transmitted to the mobile telephone by the base station, determine the version number R according to the version number of the combination of preamble format and density in PRACH configuration aggregate;

The version number is obtained through the formula $$R = \left\lfloor \frac{N_{RA}^{BW} \cdot N_{SP}}{D} \right\rfloor$$

according to the number $N_{RA}^{BW}$ of the PRACH in the frequency domain supported by the system, the number $N_{SP}$ of the PRACH;

The version number is $$R = \min\left(\left\lfloor \frac{N_{RA}^{BW} \cdot N_{SP}}{D} \right\rfloor, 3\right);$$

that is to say, the maximum value of the version number is limited as 3;

The version number r can be obtained in two ways:

the version number is obtained directly through the PRACH configuration type transmitted to the mobile telephone by the base station;

the version number is calculated according to the ID of the cell, namely $r=N_{ID}^{cell} \mod R$;

And $r \in [0, R-1]$.

Using the method provided by the present invention to perform PRACH time and frequency location mapping enables uniformly distributing the PRACHs which require to be processed by the same base station in the time domain, and decreasing the inter-cell interference of the second type PRACH to the utmost extent at the same time.

The First Embodiment

It is assumed that the density of the PRACH is D (D can take the values of 0.5, 1, 2, 3, 4, 5, 6 or 10 PRACH/10 ms); the version number is R; the serial number is $N_{ind}^{RA}=0, 1, \ldots, R\lceil D \rceil - 1$; the index of usable PRACH of certain cell within one random access cycle is d (also known as PRACH index or density index in a cell, $d=0, 1, \ldots, \lceil D \rceil - 1$); version number is r ($r \in [0, R-1]$); the number of the conversion points from downlink to uplink in 10 ms radio frame is $N_{SP}$; and the number of certain format of PRACH received by the time domain in a half frame is $N_{RA}^{HF}(i)$.

PRACH numbering: the PRACHs are numbered according to the sequence of increasing the density index first, and then increasing the version number, namely $N_{ind}^{RA}=r\lceil D \rceil + d$, wherein $N_{ind}^{RA}=0, 1, R\lceil D \rceil - 1, d=0, 1, \ldots, \lceil D \rceil - 1, r=0, 1, \ldots, R-1$.

Frequency Domain Mapping

For Preamble Format 0-4

The PRACHs with the same time domain location and version number r are mapped from two sides to the middle in the frequency resource which could be used for transmitting the PRACHs.

Supposing that the number of the PRACHs with the same time domain location and version number r is W, and the serial numbers of the PRACHs are respectively $w=0, 1, 2, \ldots, W-1$, then the mapping method is as follows: if w is an even number, the PRACHs are mapped from low frequency to high frequency in the frequency resource which can be used for transmitting the PRACHs according to sequence of w from small to big; and if w is an odd number, the PRACHs are mapped from high frequency to low frequency in the frequency resource which can be used for transmitting the PRACHs according to sequence of w from small to big, wherein one PRACH occupies 6 resource blocks, and the frequency bands occupied by two adjacent PRACHs in the frequency domain do not overlap with each other; the same mapping process is adopted for each version number r.

The above mentioned mapping principle can be expressed by the following formula:

Frequency domain mapping formula:

$$k_{RA} = \begin{cases} k'_{RA} + 6 \left\lfloor \frac{f_{RA}^r(t_{RA}^0, t_{RA}^1, t_{RA}^2)}{2} \right\rfloor, & f_{RA}^r(t_{RA}^0, t_{RA}^1, t_{RA}^2) \bmod 2 = 0 \\ N_{RB}^{UL} - k'_{RA} - 6 - 6 \left\lfloor \frac{f_{RA}^r(t_{RA}^0, t_{RA}^1, t_{RA}^2)}{2} \right\rfloor, & \text{otherwise} \end{cases}$$

Wherein, $f_{RA}^r(t_{RA}^0, t_{RA}^1, t_{RA}^2)$ is the frequency domain mapping index (the serial number of the PRACH in frequency domain) of a certain format of PRACH, and $f_{RA}^r(t_{RA}^0, t_{RA}^1, t_{RA}^2)=0, 1, 2, \ldots, N_{RA}^r(t_{RA}^0, t_{RA}^1, t_{RA}^2)-1$; its meaning is the serial numbers of all the PRACHs have the version number r and are in the same time domain location determined by the parameter $(t_{RA}^0, t_{RA}^1, t_{RA}^2)$; $k'_{RA}$ is the location of the first resource block (RB) which could be used by the PRACHs in the low frequency ($k'_{RA} \in [0, N_{RB}^{UL}-6]$); $N_{RA}^r(t_{RA}^0, t_{RA}^1, t_{RA}^2)$ is the number of all the PRACHs which have the version number r and are in the same time domain location determined by the parameter $(t_{RA}^0, t_{RA}^1, t_{RA}^2)$.

For preamble format 0-3, the version number R can be determined through the PRACH configuration type transmitted to the mobile telephone by the base station according to the version number of the combination of preamble format and density in PRACH configuration aggregate. For preamble format 4, $$R = \left\lfloor \frac{N_{RA}^{BW} \cdot N_{SP}}{D} \right\rfloor,$$

$N_{RA}^{BW}$ is number of the PRACH admissible by the frequency domain under current system bandwidth; or $$R = \min\left(\left\lfloor \frac{N_{RA}^{BW} \cdot N_{SP}}{D} \right\rfloor, 3\right);$$

or the version number R is determined through the PRACH configuration type transmitted to the mobile telephone by the base station according to the version number of the combination of preamble format and density in PRACH configuration aggregate.

For preamble format 0-3, the version number r can be obtained directly through the PRACH configuration type transmitted to the mobile telephone by the base station. For preamble format 4, $r=N_{ID}^{cell}$ mod R, or r is obtained directly through the PRACH configuration type transmitted to the mobile telephone by the base station, wherein r∈[0, R−1].

Figure 3:
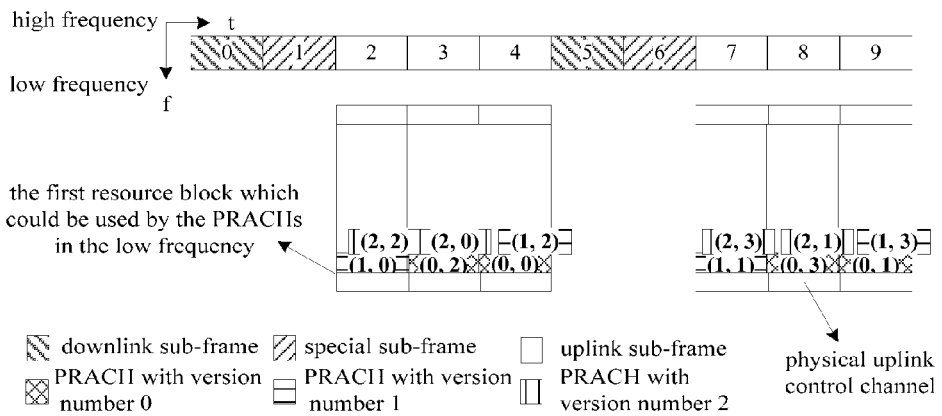
FIG. 3 shows Example 1 of the mapping result of the Embodiment 1.

The mapping result of the embodiment will be detailed hereafter by giving examples:

If R=3, D=4, the format of the PRACH is preamble format 0, D:U=1:3, then $N_{ind}^{RA}$=0, 1, . . . , 11 respectively correspond to (0, 0), (0, 1), (0, 2), (0, 3), (1, 0), (1, 1), (1, 2), (1, 3), (2, 0), (2, 1), (2, 2), (2, 3). $f_{RA}^0$(0,0,1)=0 corresponds to (0, 2), $f_{RA}^2$(0,0,1)=0 corresponds to (2, 0), $f_{RA}^0$(0,0,2)=0 corresponds to (0, 0), $f_{RA}^1$(0,0,2)=0 corresponds to (1, 2), $f_{RA}^1$(0, 0,0)=0 corresponds to (1, 0), $f_{RA}^2$(0,0,0)=0 corresponds to (2, 2), $f_{RA}^0$(0,1,1)=0 corresponds to (0, 3), $f_{RA}^2$(0,1,1)=0 corresponds to (2, 1), $f_{RA}^0$(0,1,2)=0 corresponds to (0, 1), $f_{RA}^2$(0, 1,0)=0 corresponds to (2, 3). $k'_{RA}$=1, the mapping results of the time and frequency locations are as shown in FIG. 3, wherein (0, 0) and (1, 2) have the same frequency domain location; (0, 2) and (2, 0) have the same frequency domain location; (1, 1) and (2, 3) have the same frequency domain location; (0, 3) and (2, 1) have the same frequency domain location; (1, 3) and (0, 1) have the same frequency domain location; (1, 0) and (2, 2) have the same frequency domain location.

Figure 4:
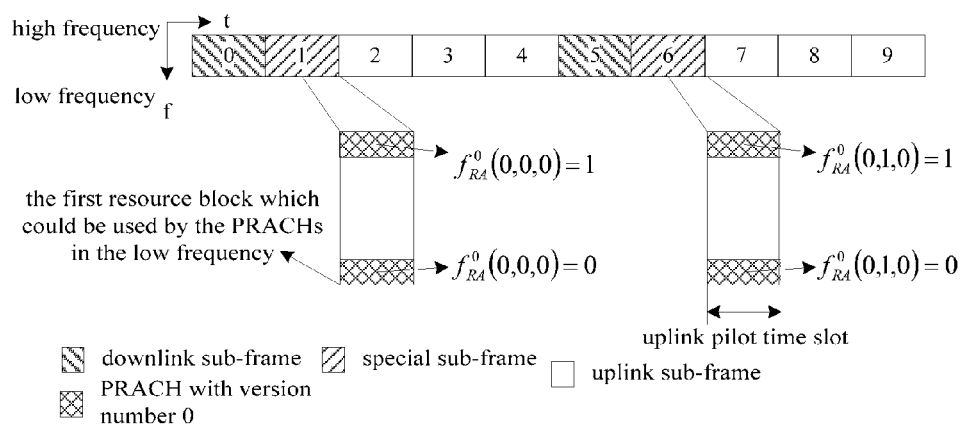
FIG. 4 shows Example 2 of the mapping result of the Embodiment 1.

If R=1, D=4, the format of the PRACH is preamble format 4, D: U=1:3, then $N_{ind}^{RA}$=0, 1, . . . , 3 respectively correspond to (0, 0), (0, 1), (0, 2), (0, 3). $f_{RA}^0$(0,0,0)=0, 1 respectively correspond to (0, 0), (0, 2) or (0, 2), (0, 0), and $N_{RA}^0$(0,0,0)=2; $f_{RA}^0$(0,1,0)=0, 1 respectively correspond to (0, 1), (0, 3) or (0, 3), (0, 1), and $N_{RA}^0$(0,1,0)=2. $k'_{RA}$=0, the mapping results of the time and frequency locations are as shown in FIG. 4.

The Second Embodiment

Supposing that the density of the PRACH is D (D can take the values of 0.5, 1, 2, 3, 4, 5, 6 or 10 PRACH/10 ms); the version number is R; the serial number is $N_{ind}^{RA}$=0, 1, . . . , R⌈D⌉−1; the index of usable PRACH of certain cell within one random access cycle is d (also known as PRACH index or density index in a cell, d=0, 1, . . . , ⌈D⌉−1); version number is r (r∈[0, R−1]); the number of the conversion points from downlink to uplink in 10 ms radio frame is $N_{SP}$; and the number of a certain format of PRACH received by the time domain in a half frame is $N_{RA}^{HF}$(i)

PRACH numbering: the PRACHs are numbered according to the sequence of increasing the density index first, and then increasing the version number, namely $N_{ind}^{RA}$=r⌈D⌉+d, wherein $N_{ind}^{RA}$=0, 1, R⌈D⌉−1, d=0, 1, . . . , ⌈D⌉−1, r=0, 1, . . . , R−1.

Frequency Domain Mapping

For Preamble Format 0-3

The PRACHs with the same time domain location and version number r are mapped from two sides to the middle in the frequency resource which can be used for transmitting the PRACHs.

Supposing that the number of the PRACHs with the same time domain location and version number r is W, and the serial numbers of the PRACHs are respectively w=0, 1, 2, . . . , W−1, then the mapping method is as follows: if w is an even number, the PRACHs are mapped from low frequency to high frequency in the frequency resource which can be used for transmitting the PRACHs according to sequence of w from small to big; and if w is an odd number, the PRACHs are mapped from high frequency to low frequency in the frequency resource which can be used for transmitting the PRACHs according to sequence of w from small to big, wherein one PRACH occupies 6 resource blocks, and the frequency bands occupied by two adjacent PRACHs in the frequency domain do not overlap; the same mapping process is adopted for each version number r.

For Preamble Format 4

The PRACHs with the same version number r and mapped into a certain UpPTS are mapped from low frequency to high frequency or from high frequency to low frequency in the frequency resource which can be used for transmitting the PRACHs. The two adjacent UpPTSs adopt different mapping sequences. One PRACH occupies 6 resource blocks, and the frequency bands occupied by two adjacent PRACHs in the frequency domain do not overlap. The same mapping process is adopted for each version number r. specifically:

For the situation that one radio frame has two UpPTSs,

In the first UpPTS, the PRACHs are mapped from low frequency to high frequency in frequency resource which can be used for transmitting the PRACHs; in the second UpPTS, the PRACHs are mapped from high frequency to low frequency in frequency resource which can be used for transmitting the PRACHs;

For the situation that one radio frame has one UpPTS,

In the UpPTS of even numbered radio frames, the PRACHs are mapped from low frequency to high frequency in frequency resource which can be used for transmitting the PRACHs; in the UpPTS of odd numbered radio frames, the PRACHs are mapped from high frequency to low frequency in frequency resource which can be used for transmitting the PRACHs.

The above mentioned mapping principle can be expressed by the following formulas:

Frequency domain mapping formulas:

For Preamble Format 0-3

$$k_{RA} = \begin{cases} k'_{RA} + 6\left\lfloor \dfrac{f_{RA}^r(t_{RA}^0, t_{RA}^1, t_{RA}^2)}{2} \right\rfloor, & \text{if } f_{RA}^r(t_{RA}^0, t_{RA}^1, t_{RA}^2) \bmod 2 = 0 \\ N_{RB}^{UL} - k'_{RA} - 6 - 6\left\lfloor \dfrac{f_{RA}^r(t_{RA}^0, t_{RA}^1, t_{RA}^2)}{2} \right\rfloor, & \text{otherwise} \end{cases}$$

For Preamble Format 4

$$k_{RA} = \begin{cases} k'_{RA} + 6 f_{RA}^r(t_{RA}^0, t_{RA}^1, t_{RA}^2), & \text{if } \left( \frac{(SFN \bmod 2) \cdot}{(2 - N_{SP}) + t_{RA}^1} \right) \bmod 2 = 0 \\ N_{RB}^{UL} - k'_{RA} - 6 - 6 f_{RA}^r(t_{RA}^0, t_{RA}^1, t_{RA}^2), & \text{otherwise} \end{cases}$$

Wherein,
$f_{RA}^r(t_{RA}^0, t_{RA}^1, t_{RA}^2)$ is the frequency domain mapping index (the serial number of the PRACH in frequency domain) of a certain format of PRACH, and $f_{RA}^r(t_{RA}^0, t_{RA}^1, t_{RA}^2) = 0, 1, 2, \ldots, N_{RA}^r(t_{RA}^0, t_{RA}^1, t_{RA}^2) - 1$; Its meaning is the serial numbers of all the PRACHs which have the version number r and are in the same time domain location determined by the parameter $(t_{RA}^0, t_{RA}^1, t_{RA}^2)$; $k'_{RA}$ is the first resource block (RB) which could be used by the PRACHs in the low frequency ($k'_{RA} \in [0, N_{RB}^{UL} - 6]$); $N_{RA}^r(t_{RA}^0, t_{RA}^1, t_{RA}^2)$ is the number of all the PRACHs which have the version number r and are in the same time domain location determined by the parameter $(t_{RA}^0, t_{RA}^1, t_{RA}^2)$.

For preamble format 0-3 PRACHs, L is the number of the uplink subframes occupied by the preamble format 0-3 PRACHs; $N_{sub-frame}^{UL,HF}(i)$ the number of the uplink subframes in a half frame; for preamble format 4, L=1, $N_{sub-frame}^{UL,HF}(i)$ is the number (1 or 0) of UpPTS in a half frame; i=0 refers to the first half frame, and i=1 refers to the second half frame, and $$N_{RA}^{HF}(i) = \left\lfloor \frac{N_{sub-frame}^{UL,HF}(i)}{L} \right\rfloor.$$

$N_{SP}$ is the number of the switch points from downlink to uplink; the value of $N_{SP}$ equals to the number of UpPTSs, and equals to the number of the uplink pilot time slots in the radio frame.

SFN is the system frame number or is known as the radio frame number.

For preamble format 0-3, the version number R can be determined through the PRACH configuration type transmitted to the mobile telephone by the base station according to the version number of the combination of preamble format and density in PRACH configuration aggregate. For preamble format 4, $$R = \left\lfloor \frac{N_{RA}^{BW} \cdot N_{SP}}{D} \right\rfloor,$$

$N_{RA}^{BW}$ is number of the PRACH admissible by the frequency domain under current system bandwidth; or $$R = \min\left( \left\lfloor \frac{N_{RA}^{BW} \cdot N_{SP}}{D} \right\rfloor, 3 \right);$$

or the version number R is determined through the PRACH configuration type transmitted to the mobile telephone by the base station according to the version number of the combination of preamble format and density in PRACH configuration aggregate.

For preamble format 0-3, the version number r can be obtained directly through the PRACH configuration type transmitted to the mobile telephone by the base station. For preamble format 4, $r = N_{ID}^{cell} \bmod R$, or is obtained directly through the PRACH configuration type transmitted to the mobile telephone by the base station, wherein $r \in [0, R-1]$.

Figure 5:
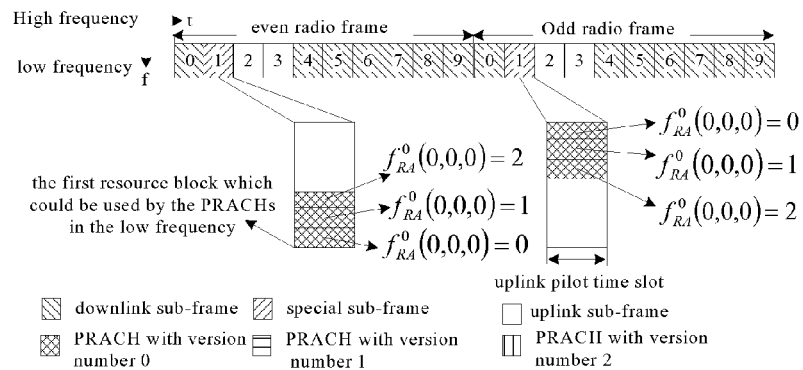
FIG. 5 shows Example 1 of the mapping result of the Embodiment 2, 3, and 6.

The mapping result of the embodiment will be detailed hereafter by giving examples:

If R=1, D=3, the format of the PRACH is preamble format 4, D: U=8:2 (one conversion point from uplink to downlink, namely $N_{SP}=1$), then $N_{ind}^{RA}=0, 1, \ldots, 2$ respectively correspond to (0, 0), (0, 1), (0, 2). $f_{RA}^0(0,0,0)=0, 1, 2$ correspond to the three PRACHs with the version number 0, and the corresponding relation can be random. For example, $f_{RA}^0(0,0,0)=0, 1, 2$ can respectively correspond to (0, 0), (0, 1), (0, 2), and can also respectively correspond to (0, 0), (0, 2), (0, 1). $k'_{RA}=0$, the mapping results of the time and frequency location are as shown in FIG. 5.

Figure 6:
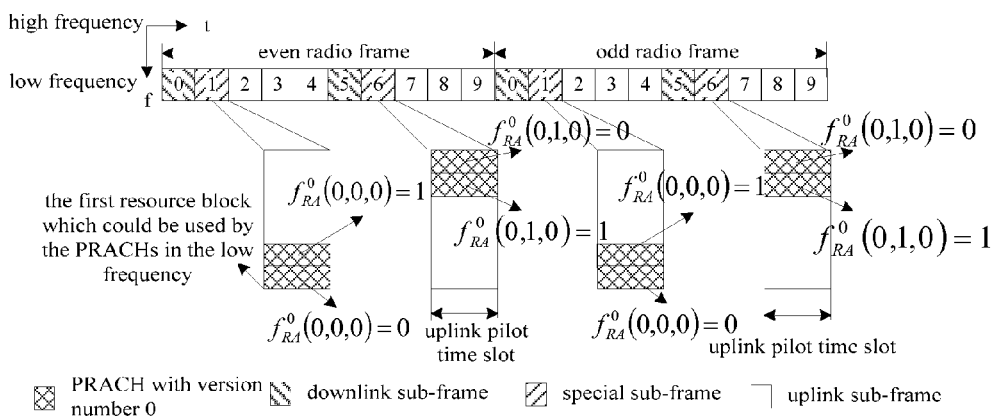
FIG. 6 shows Example 2 of the mapping result of the Embodiment 2.

If R=1, D=4, the format of the PRACH is preamble format 4, D:U=1:3, then $N_{ind}^{RA}=0, 1, \ldots, 3$ respectively correspond to (0, 0), (0, 1), (0, 2), (0, 3). $f_{RA}^0(0,0,0)=0, 1$ correspond to the two PRACHs mapped into the UpPTS of the first half frame and with the version number 0, and the corresponding relation can be random. For example, $f_{RA}^0(0,0,0)=0, 1$ can respectively correspond to (0, 0), (0, 2) or (0, 2), (0, 0). $f_{RA}^0(0,1,0)=0, 1$ correspond to the two PRACHs mapped into the UpPTS of the second half frame and with the version number 0, and the corresponding relation can be random. For example, $f_{RA}^0(0,1,0)=0, 1$ can respectively correspond to (0, 1), (0, 3) or (0, 3), (0, 1). $k'_{RA}=0$, the mapping results of the time and frequency locations are as shown in FIG. 6.

The Third Embodiment

Supposing that the density of the PRACH is D (D can take the values of 0.5, 1, 2, 3, 4, 5, 6 or 10 PRACH/10 ms); the version number is R; the serial number is $N_{ind}^{RA}=0, 1, \ldots, R\lceil D \rceil - 1$; the index of usable PRACH of a certain cell within one random access cycle is d (also known as PRACH index or density index in a cell, d=0, 1, \ldots, $\lceil D \rceil - 1$); version number is r ($r \in [0, R-1]$); the number of the switch points from downlink to uplink in 10 ms radio frame is $N_{SP}$; and the number of certain format of PRACH received by the time domain in a half frame is $N_{RA}^{HF}(i)$.

PRACH numbering: the PRACHs are numbered according to the sequence of increasing the density index first, and then increasing the version number, namely $N_{ind}^{RA}=r\lceil D \rceil + d$, wherein $N_{ind}^{RA}=0, 1, R\lceil D \rceil - 1$, d=0, 1, \ldots, $\rceil D \rceil - 1$, r=0, 1, \ldots, R-1.

Frequency Domain Mapping
For Preamble Format 0-3
The PRACHs with the same time domain location and version number r are mapped from two sides to the middle in the frequency resource which could be used for transmitting the PRACHs.

Supposing that the number of the PRACHs with the same time domain location and version number r is W, and the serial numbers of the PRACHs are respectively w=0, 1, 2, \ldots, W-1, then the mapping method is as follows: if w is an even number, the PRACHs are mapped from low frequency to high frequency in the frequency resource which can be used for transmitting the PRACHs according to sequence of w from small to big; and if w is an odd number, the PRACHs are mapped from high frequency to low frequency in the frequency resource which could be used for transmitting the PRACHs according to sequence of w from small to big, wherein one PRACH occupies 6 resource blocks, and the frequency bands occupied by two adjacent PRACHs in the frequency domain do not overlap; the same mapping process is adopted for each version number r.

For Preamble Format 4

The PRACHs with the same version number r and mapped into certain UpPTS are mapped from low frequency to high frequency or from high frequency to low frequency in the frequency resource which can be used for transmitting the PRACHs. The two adjacent UpPTSs adopt different mapping sequences. One PRACH occupies 6 resource blocks, and the frequency bands occupied by two adjacent PRACHs in the frequency domain do not overlap. The same mapping process is adopted for each version number r. Specifically:

In an even numbered radio frames, the UpPTS of the first half frame is mapped from low frequency to high frequency in the frequency resource which could be used for transmitting the PRACHs; the UpPTS of the second half frame is mapped from high frequency to low frequency in the frequency resource which can be used for transmitting the PRACHs. In an odd numbered radio frames, the UpPTS of the first half frame is mapped from high frequency to low frequency in the frequency resource which can be used for transmitting the PRACHs; the UpPTS of the second half frame is mapped from low frequency to high frequency in the frequency resource which can be used for transmitting the PRACHs.

The above mentioned mapping principle can be expressed by the following formulas:

Frequency domain mapping formulas:

For Preamble Format 0-3

$$k_{RA} = \begin{cases} k'_{RA} + 6\left\lfloor \frac{f^r_{RA}(t^0_{RA}, t^1_{RA}, t^2_{RA})}{2} \right\rfloor, & \text{if } f^r_{RA}(t^0_{RA}, t^1_{RA}, t^2_{RA}) \bmod 2 = 0 \\ N^{UL}_{RB} - k'_{RA} - 6 - 6\left\lfloor \frac{f^r_{RA}(t^0_{RA}, t^1_{RA}, t^2_{RA})}{2} \right\rfloor, & \text{otherwise} \end{cases}$$

For Preamble Format 4

$$k_{RA} = \begin{cases} k'_{RA} + 6f^r_{RA}(t^0_{RA}, t^1_{RA}, t^2_{RA}), & \text{if } \left( \frac{(SFN \bmod 2) \cdot}{(2 - N_{SP}) + t^1_{RA}} \right) \bmod 2 = 0 \\ N^{UL}_{RB} - k'_{RA} - 6 - 6f^r_{RA}(t^0_{RA}, t^1_{RA}, t^2_{RA}), & \text{otherwise} \end{cases}$$

Wherein, $f^r_{RA}(t^0_{RA}, t^1_{RA}, t^2_{RA})$ is the frequency domain mapping index (the serial number of the PRACH in frequency domain) of a certain format of PRACH, and $f^r_{RA}(t^0_{RA}, t^1_{RA}, t^2_{RA}) = 0, 1, 2, \ldots, N^r_{RA}(t^0_{RA}, t^1_{RA}, t^2_{RA}) - 1$; Its meaning is the serial numbers of all the PRACHs which have the version number r and are in the same time domain location determined by the parameter $(t^0_{RA}, t^1_{RA}, t^2_{RA})$; $k'_{RA}$ is the first resource block (RB) which could be used by the PRACHs in the low frequency ($k'_{RA} \in [0, N^{UL}_{RB} - 6]$); $N^r_{RA}(t^0_{RA}, t^1_{RA}, t^2_{RA})$ is the number of all the PRACHs which have the version number r and are in the same time domain location determined by the parameter $(t^0_{RA}, t^1_{RA}, t^2_{RA})$.

For preamble format 0-3 PRACHs, L is the number of the uplink subframes occupied by the preamble format 0-3 PRACHs; $N^{UL,HF}_{sub-frame}(i)$ the number of the uplink subframes in a half frame; for preamble format 4, L=1, $N^{UL,HF}_{sub-frame}(i)$ is the number (1 or 0) of UpPTS in a half frame; i=0 refers to the first half frame, and i=1 refers to the second half frame, and $$N^{HF}_{RA}(i) = \left\lfloor \frac{N^{UL,HF}_{sub-frame}(i)}{L} \right\rfloor.$$

$N_{SP}$ is the number of the switch points from downlink to uplink; the value of $N_{SP}$ equals to the number of UpPTSs;

SFN is the system frame number or is known as the radio frame number.

For preamble format 0-3, the version number R can be determined through the PRACH configuration type transmitted to the mobile telephone by the base station according to the version number of the combination of preamble format and density in PRACH configuration aggregate. For preamble format 4, $$R = \left\lfloor \frac{N^{BW}_{RA} \cdot N_{SP}}{D} \right\rfloor,$$

$N^{BW}_{RA}$ is number of the PRACH admissible by the frequency domain under current system bandwidth; or $$R = \min\left( \left\lfloor \frac{N^{BW}_{RA} \cdot N_{SP}}{D} \right\rfloor, 3 \right);$$

or the version number R is determined through the PRACH configuration type transmitted to the mobile telephone by the base station according to the version number of the combination of preamble format and density in PRACH configuration aggregate.

For preamble format 0-3, the version number r can be obtained directly through the PRACH configuration type transmitted to the mobile telephone by the base station. For preamble format 4, $r = N^{cell}_{ID} \bmod R$, or is obtained directly through the PRACH configuration type transmitted to the mobile telephone by the base station, wherein $r \in [0, R-1]$.

The mapping result of the embodiment will be detailed hereafter by giving examples:

If R=1, D=3, the format of the PRACH is preamble format 4, D:U=8:2 (one conversion point from uplink to downlink, namely $N_{SP}=1$), then $N^{RA}_{ind}=0, 1, \ldots, 2$ respectively correspond to (0, 0), (0, 1), (0, 2). $f^0_{RA}(0,0,0)=0, 1, 2$ correspond to the three PRACHs with the version number 0, and the corresponding relation can be random. For example, $f^0_{RA}(0,0,0)=0, 1, 2$ can respectively correspond to (0, 0), (0, 1), (0, 2), and can also respectively correspond to (0, 0), (0, 2), (0, 1). $k'_{RA}=0$, the mapping results of the time and frequency locations are as shown in FIG. 5.

If R=1, D=4, the format of the PRACH is preamble format 4, D:U=1:3, then $N^{RA}_{ind}=0, 1, \ldots, 3$ respectively correspond to (0, 0), (0, 1), (0, 2), (0, 3). $f^0_{RA}(0,0,0)=0, 1$ correspond to the two PRACHs mapped into the UpPTS of the first half frame and with the version number 0, and the corresponding relation can be random. For example, $f^0_{RA}(0,0,0)=0, 1$ can respectively correspond to (0, 0), (0, 2) or (0, 2), (0, 0). $f^0_{RA}(0,1,0)=0, 1$ correspond to the two PRACHs mapped into the UpPTS of the second half frame and with the version number 0, and the corresponding relation can be random.

Figure 7:
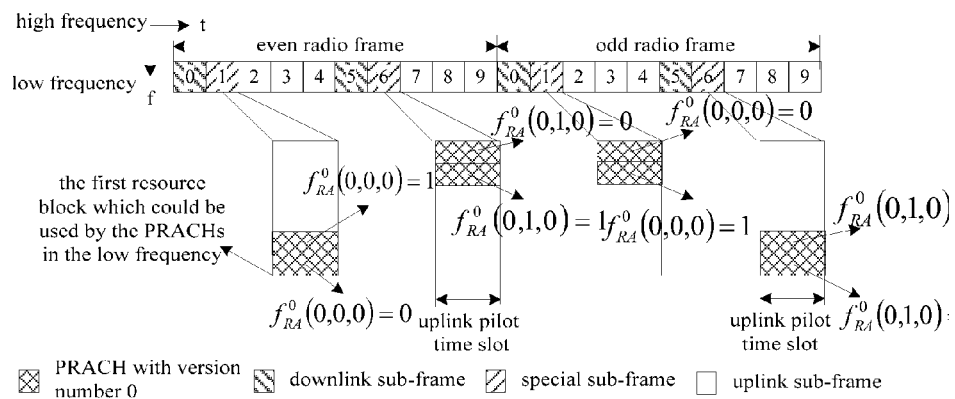
FIG. 7 shows Example 2 of the mapping result of the Embodiment 3.

For example, $f^0_{RA}(0,1,0)=0, 1$ can respectively correspond to (0, 1), (0, 3) or (0, 3), (0, 1). $k'_{RA}=0$, the mapping results of the time and frequency locations are as shown in FIG. 7.

The Fourth Embodiment

Supposing that the density of the PRACH is D (D can take the values of 0.5, 1, 2, 3, 4, 5, 6 or 10 PRACH/10 ms); the version number is R; the serial number is $N_{ind}^{RA}=0, 1, \ldots, \lceil D \rceil-1$; the index of usable PRACH of certain cell within one random access cycle is d (also known as PRACH index or density index in a cell, d=0, 1, ..., $\lceil D \rceil-1$); version number is r (r∈[0, R−1]); the number of the conversion points from downlink to uplink in 10 ms radio frame is $N_{SP}$; and the number of certain format of PRACH received by the time domain in a half frame is N.

PRACH numbering: the PRACHs are numbered according to the sequence of increasing the density index first, and then increasing the version number, namely $N_{ind}^{RA}=r\lceil D \rceil+d$ wherein $N_{ind}^{RA}=0, 1, \ldots, R\lceil D \rceil-1$, d=0, 1, ..., $\lceil D \rceil-1$, r=0, 1, ..., R−1.

Frequency Domain Mapping

For Preamble Format 0-3

The PRACHs with the same time domain location and version number r are mapped from two sides to the middle in the frequency resource which could be used for transmitting the PRACHs.

Supposing that the number of the PRACHs with the same time domain location and version number r is W, and the serial numbers of the PRACHs are respectively w=0, 1, 2, ..., W−1, then the mapping method is as follows: if w is an even number, the PRACHs are mapped from low frequency to high frequency in the frequency resource which can be used for transmitting the PRACHs according to sequence of w from small to big; and if w is an odd number, the PRACHs are mapped from high frequency to low frequency in the frequency resource which can be used for transmitting the PRACHs according to sequence of w from small to big, wherein one PRACH occupies 6 resource blocks, and the frequency bands occupied by two adjacent PRACHs in the frequency domain do not overlap; the same mapping process is adopted for each version number r.

For Preamble Format 4

Supposing that the number of the PRACHs mapped into a certain UpPTS is W, and the PRACHs are renumbered as w=0, 1, 2, ..., W−1 according to the sequence of $N_{ind}^{RA}$ from small to big, then the mapping method is as follows:

If w is an even number, the PRACHs are mapped from low frequency to high frequency in usable frequency band according to sequence of w from small to big; and if w is an odd number, the PRACHs are mapped from high frequency to low frequency in usable frequency band according to sequence of w from small to big, wherein one PRACH occupies 6 resource blocks, and the frequency bands occupied by two adjacent PRACHs in the frequency domain do not overlap with each other.

The above mentioned mapping principle can be expressed by the following formulas:

Frequency domain mapping formulas:

For Preamble Format 0-3

$$k_{RA} = \begin{cases} k'_{RA} + 6\left\lfloor \frac{f_{RA}^r(t_{RA}^0, t_{RA}^1, t_{RA}^2)}{2} \right\rfloor, & \text{if } f_{RA}^r(t_{RA}^0, t_{RA}^1, t_{RA}^2) \bmod 2 = 0 \\ N_{RB}^{UL} - k'_{RA} - 6 - 6\left\lfloor \frac{f_{RA}^r(t_{RA}^0, t_{RA}^1, t_{RA}^2)}{2} \right\rfloor, & \text{otherwise} \end{cases}$$

For Preamble Format 4

$$k_{RA} = \begin{cases} k'_{RA} + 6\left\lfloor \frac{f_{SRA}}{2} \right\rfloor, & \text{if } f_{SRA} \bmod 2 = 0 \\ N_{RB}^{UL} - 6 - k'_{RA} - 6\left\lfloor \frac{f_{SRA}}{2} \right\rfloor, & \text{otherwise} \end{cases}$$

Wherein, $f_{RA}^r(t_{RA}^0, t_{RA}^1, t_{RA}^2)$ is the frequency domain mapping index (the serial number of the PRACH in frequency domain) of preamble format 0-3 PRACHs, and $f_{RA}^r(t_{RA}^0, t_{RA}^1, t_{RA}^2)=0, 1, 2, \ldots, N_{RA}^r(t_{RA}^0, t_{RA}^1, t_{RA}^2)-1$; Its meaning is the serial numbers of all the PRACHs which have the version number r and are in the same time domain location determined by the parameter $(t_{RA}^0, t_{RA}^1, t_{RA}^2)$; $k'_{RA}$ is the first resource block (RB) which can be used by the PRACHs in the low frequency ($k'_{RA} \in [0, N_{RB}^{UL}-6]$); $N_{RA}^r(t_{RA}^0, t_{RA}^1, t_{RA}^2)$ is the number of all the PRACHs which have the version number r and are in the same time domain location determined by the parameter $(t_{RA}^0, t_{RA}^1, t_{RA}^2)$.

$f_{SRA}^r$ is the frequency domain mapping index (the serial number of the PRACH in frequency domain) of preamble format 4 PRACHs, and $$f_{SRA} = \left\lfloor \frac{N_{RA}^{\prime ind}}{\sum_{i=0}^{N_{SP}-1} N_{RA}^{HF}(i)} \right\rfloor;$$

$k'_{RA}$ is the first resource block (RB) which can be used by the PRACHs in the low frequency ($k'_{RA} \in [0, N_{RB}^{UL}-6]$);

For preamble format 0-3 PRACHs, L is the number of the uplink subframes occupied by the preamble format 0-3 PRACHs; $N_{sub-frame}^{UL,HF}(i)$ the number of the uplink subframes in a half frame; for preamble format 4, L=1, $N_{sub-frame}^{UL,HF}(i)$ is the number (1 or 0) of UpPTS in a half frame; i=0 refers to the first half frame, and i=1 refers to the second half frame, and $$N_{RA}^{HF}(i) = \left\lfloor \frac{N_{sub-frame}^{UL,HF}(i)}{L} \right\rfloor.$$

$N_{SP}$ is the number of the switch points from downlink to uplink; the value of $N_{SP}$ equals to the number of UpPTSs.

For preamble format 0-3, the version number R can be determined through the PRACH configuration type transmitted to the mobile telephone by the base station according to the version number of the combination of preamble format and density in PRACH configuration aggregate. For preamble format 4, $$R = \left\lfloor \frac{N_{RA}^{BW} \cdot N_{SP}}{D} \right\rfloor,$$

$N_{RA}^{BW}$ is number of the PRACH admissible by the frequency domain under current system bandwidth; or $$R = \min\left(\left\lfloor \frac{N_{RA}^{BW} \cdot N_{SP}}{D} \right\rfloor, 3\right);$$

or the version number R is determined through the PRACH configuration type transmitted to the mobile telephone by the base station according to the version number of the combination of preamble format and density in PRACH configuration aggregate.

For preamble format 0-3, the version number r can be obtained directly through the PRACH configuration type transmitted to the mobile telephone by the base station. For preamble format 4, $r = N_{ID}^{cell} \mod R$, or is obtained directly through the PRACH configuration type transmitted to the mobile telephone by the base station, wherein $r \in [0, R-1]$.

The Fifth Embodiment

Supposing that the density of the PRACH is D (D can take the values of 0.5, 1, 2, 3, 4, 5, 6 or 10 PRACH/10 ms); the version number is R; the serial number is $N_{ind}^{RA} = 0, 1, \ldots, R\lceil D \rceil - 1$; the index of usable PRACH of certain cell within one random access cycle is d (also known as PRACH index or density index in a cell, $d = 0, 1, \ldots, \lceil D \rceil - 1$); version number is r ($r \in [0, R-1]$); the number of the switch points from downlink to uplink in 10 ms radio frame is $N_{SP}$; and the number of a certain format of PRACH received by the time domain in a half frame is $N_{RA}^{HF}(i)$.

PRACH numbering: the PRACHs are numbered according to the sequence of increasing the density index first, and then increasing the version number, namely $N_{ind}^{RA} = r\lceil D \rceil + d$, wherein $N_{ind}^{RA} = 0, 1, R\lceil D \rceil - 1$, $d = 0, 1, \ldots, \lceil D \rceil - 1$, $r = 0, 1, \ldots, R-1$.

Frequency Domain Mapping

For Preamble Format 0-3

The PRACHs with the same time domain location and version number r are mapped from two sides to the middle in the frequency resource which can be used for transmitting the PRACHs.

Supposing that the number of the PRACHs with the same time domain location and version number r is W, and the serial numbers of the PRACHs are respectively $w = 0, 1, 2, \ldots, W-1$, then the mapping method is as follows: if w is an even number, the PRACHs are mapped from low frequency to high frequency in the frequency resource which could be used for transmitting the PRACHs according to sequence of w from small to big; and if w is an odd number, the PRACHs are mapped from high frequency to low frequency in the frequency resource which can be used for transmitting the PRACHs according to sequence of w from small to big, wherein one PRACH occupies 6 resource blocks, and the frequency bands occupied by two adjacent PRACHs in the frequency domain do not overlap with each other; the same mapping process is adopted for each version number r.

For Preamble Format 4

Supposing that the number of the PRACHs mapped into a certain UpPTS is W, and the PRACHs are renumbered as $w = 0, 1, 2, \ldots, W-1$ according to the sequence of $N_{ind}^{RA}$ from small to big, then the mapping method is as follows:

If w is an even number, the PRACHs are mapped from low frequency to high frequency in usable frequency band according to sequence of w from small to big; and if w is odd number, the PRACHs are mapped from high frequency to low frequency in usable frequency band according to sequence of w from big to small, wherein one PRACH occupies 6 resource blocks, and the frequency bands occupied by two adjacent PRACHs in the frequency domain do not overlap with each other.

The above mentioned mapping principle can be expressed by the following formulas:

Frequency domain mapping formulas:

For Preamble Format 0-3

$$k_{RA} = \begin{cases} k'_{RA} + 6 \left\lfloor \dfrac{f_{RA}^r(t_{RA}^0, t_{RA}^1, t_{RA}^2)}{2} \right\rfloor, & \text{if } f_{RA}^r(t_{RA}^0, t_{RA}^1, t_{RA}^2) \mod 2 = 0 \\ N_{RB}^{UL} - k'_{RA} - 6 - 6 \left\lfloor \dfrac{f_{RA}^r(t_{RA}^0, t_{RA}^1, t_{RA}^2)}{2} \right\rfloor, & \text{otherwise} \end{cases}$$

For Preamble Format 4

$$k_{RA} = \begin{cases} k'_{RA} + 6 \left\lfloor \dfrac{f_{SRA}}{2} \right\rfloor, & \text{if } f_{SRA} \mod 2 = 0 \\ N_{RB}^{UL} - 6 - k'_{RA} - 6 \left\lfloor \dfrac{f_{SRA}}{2} \right\rfloor, & \text{otherwise} \end{cases}$$

Wherein, $f_{RA}^r(t_{RA}^0, t_{RA}^1, t_{RA}^2)$ is the frequency domain mapping index (the serial number of the PRACH in frequency domain) of preamble format 0-3 PRACHs, and $f_{RA}^r(t_{RA}^0, t_{RA}^1, t_{RA}^2) = 0, 1, 2, \ldots, N_{RA}^r(t_{RA}^0, t_{RA}^1, t_{RA}^2) - 1$; Its meaning is the serial numbers of all the PRACHs which have the version number r and are in the same time domain location determined by the parameter $(t_{RA}^0, t_{RA}^1, t_{RA}^2)$; $k'_{RA}$ is the first resource block (RB) which can be used by the PRACHs in the low frequency ($k'_{RA} \in [0, N_{RB}^{UL} - 6]$); $N_{RA}^r(t_{RA}^0, t_{RA}^1, t_{RA}^2)$ is the number of all the PRACHs which have the version number r and are in the same time domain location determined by the parameter $(t_{RA}^0, t_{RA}^1, t_{RA}^2)$.

$f_{SRA}^r$ is the frequency domain mapping index (the serial number of the PRACH in frequency domain) of preamble format 4 PRACHs, and $$f_{SRA} = \left\lfloor \dfrac{N_{RA}^{\prime ind}}{\sum_{i=0}^{N_{SP}-1} N_{RA}^{HF}(i)} \right\rfloor;$$

$k'_{RA}$ is the first resource block (RB) which could be used by the PRACHs in the low frequency ($k'_{RA} \in [0, N_{RB}^{UL} - 6]$).

For preamble format 0-3 PRACHs, L is the number of the uplink subframes occupied by the preamble format 0-3 PRACHs; $N_{sub-frame}^{UL,HF}(i)$ the number of the uplink subframes in a half frame; for preamble format 4, L=1, $N_{sub-frame}^{UL,HF}(i)$ is the number (1 or 0) of UpPTS in a half frame; i=0 refers to the first half frame, and i=1 refers to the second half frame, and $$N_{RA}^{HF}(i) = \left\lfloor \dfrac{N_{sub-frame}^{UL,HF}(i)}{L} \right\rfloor.$$

$N_{SP}$ is the number of the switch points from downlink to uplink; the value of $N_{SP}$ equals to the number of UpPTSs.

For preamble format 0-3, the version number R can be determined through the PRACH configuration type transmitted to the mobile telephone by the base station according to the version number of the combination of preamble format and density in PRACH configuration aggregate;

For preamble format 4, $$R = \left\lfloor \frac{N_{RA}^{BW} \cdot N_{SP}}{D} \right\rfloor,$$

$N_{RA}^{BW}$ is number of the PRACH admissible by the frequency domain under current system bandwidth; or $$R = \min\left(\left\lfloor \frac{N_{RA}^{BW} \cdot N_{SP}}{D} \right\rfloor, 3\right);$$

or the version number R is determined through the PRACH configuration type transmitted to the mobile telephone by the base station according to the version number of the combination of preamble format and density in PRACH configuration aggregate.

For preamble format 0-3, the version number r can be obtained directly through the PRACH configuration type transmitted to the mobile telephone by the base station. For preamble format 4, $r = N_{ID}^{cell} \mod R$, or is obtained directly through the PRACH configuration type transmitted to the mobile telephone by the base station, wherein $r \in [0, R-1]$.

The Sixth Embodiment

Supposing that the density of the PRACH is D (D can take the values of 0.5, 1, 2, 3, 4, 5, 6 or 10 PRACH/10 ms); the version number is R; the serial number is $N_{ind}^{RA}=0, 1, \ldots, R\lceil D \rceil - 1$; the index of usable PRACH of certain cell within one random access cycle is d (also known as PRACH index or density index in a cell, $d=0, 1, \ldots, \lceil D \rceil - 1$); version number is r ($r \in [0, R-1]$); the number of the conversion points from downlink to uplink in 10 ms radio frame is $N_{SP}$; and the number of a certain format of PRACH received by the time domain in a half frame is $N_{RA}^{HF}(i)$.

PRACH numbering: the PRACHs are numbered according to the sequence of increasing the density index first, and then increasing the version number, namely $N_{ind}^{RA}=r\lceil D \rceil + d$, wherein $N_{ind}^{RA}=0, 1, R\lceil D \rceil -1$, $d=0, 1, \ldots, \lceil D \rceil-1$, $r=0, 1, \ldots, R-1$.

Frequency Domain Mapping

For Preamble Format 0-3

The PRACHs with the same time domain location and version number r are mapped from two sides to the middle in the frequency resource which can be used for transmitting the PRACHs.

Supposing that the number of the PRACHs with the same time domain location and version number r is W, and the serial numbers of the PRACHs are respectively $w=0, 1, 2, \ldots, W-1$, then the mapping method is as follows: if w is an even number, the PRACHs are mapped from low frequency to high frequency in the frequency resource which can be used for transmitting the PRACHs according to sequence of w from small to big; and if w is an odd number, the PRACHs are mapped from high frequency to low frequency in the frequency resource which can be used for transmitting the PRACHs according to sequence of w from small to big, wherein one PRACH occupies 6 resource blocks, and the frequency bands occupied by two adjacent PRACHs in the frequency domain do not overlap; the same mapping process is adopted for each version number r.

For Preamble Format 4

The PRACHs with the same version number r and mapped into certain UpPTS are mapped from low frequency to high frequency or from high frequency to low frequency in the frequency resource which can be used for transmitting the PRACHs. The two adjacent UpPTSs adopt different mapping sequences. One PRACH occupies 6 resource blocks, and the frequency bands occupied by two adjacent PRACHs in the frequency domain do not overlap. The same mapping process is adopted for each version number r. Specifically:

For the situation that one radio frame has two UpPTSs,

In the first UpPTS, the PRACHs are mapped from low frequency to high frequency in frequency resource which could be used for transmitting the PRACHs; in the second UpPTS, the PRACHs are mapped from high frequency to low frequency in frequency resource which can be used for transmitting the PRACHs;

For the situation that one radio frame has one UpPTS,

In the UpPTSs of all radio frames, the PRACHs are mapped from low frequency to high frequency in usable frequency band;

The above-mentioned mapping principle can be expressed by the following formulas:

Frequency domain mapping formulas:

For Preamble Format 0-3

$$k_{RA} = \begin{cases} k'_{RA} + 6\left\lfloor \frac{f_{RA}^r(t_{RA}^0, t_{RA}^1, t_{RA}^2)}{2} \right\rfloor, & \text{if } f_{RA}^r(t_{RA}^0, t_{RA}^1, t_{RA}^2) \bmod 2 = 0 \\ N_{RB}^{UL} - k'_{RA} - 6 - 6\left\lfloor \frac{f_{RA}^r(t_{RA}^0, t_{RA}^1, t_{RA}^2)}{2} \right\rfloor, & \text{otherwise} \end{cases}$$

For Preamble Format 4

$$k_{RA} = \begin{cases} k'_{RA} + 6 f_{RA}^r(t_{RA}^0, t_{RA}^1, t_{RA}^2), & \text{if } t_{RA}^1 \bmod 2 = 0 \\ N_{RB}^{UL} - k'_{RA} - 6 - 6 f_{RA}^r(t_{RA}^0, t_{RA}^1, t_{RA}^2), & \text{otherwise} \end{cases}$$

Wherein, $f_{RA}^r(t_{RA}^0, t_{RA}^1, t_{RA}^2)$ is the frequency domain mapping index (the serial number of the PRACH in frequency domain) of a certain format of PRACH, and $f_{RA}^r(t_{RA}^0, t_{RA}^1, t_{RA}^2)=0, 1, 2, \ldots, N_{RA}^r(t_{RA}^0, t_{RA}^1, t_{RA}^2)-1$; Its meaning is the serial numbers of all the PRACHs which have the version number r and are in the same time domain location determined by the parameter $(t_{RA}^0, t_{RA}^1, t_{RA}^2)$; $k'_{RA}$ is the first resource block (RB) which could be used by the PRACHs in the low frequency ($k'_{RA} \in [0, N_{RB}^{UL}-6]$); $N_{RA}^r(t_{RA}^0, t_{RA}^1, t_{RA}^2)$ is the number of all the PRACHs which have the version number r and are in the same time domain location determined by the parameter $(t_{RA}^0, t_{RA}^1, t_{RA}^2)$;

$t_{RA}^1$ equals to 0 or 1, therefore $t_{RA}^1 \bmod 2=0$ is equivalent to $t_{RA}^1=0$; and $t_{RA}^1 \bmod 2=1$ is equivalent to $t_{RA}^1=1$;

For preamble format 0-3 PRACHs, L is the number of the uplink subframes occupied by the preamble format 0-3 PRACHs; $N_{sub-frame}^{UL,HF}(i)$ the number of the uplink subframes in a half frame; for preamble format 4, L=1, $N_{sub-frame}^{UL,HF}(i)$ is the number (1 or 0) of UpPTS in a half frame; i=0 refers to the first half frame, and i=1 refers to the second half frame, and $$N_{RA}^{HF}(i) = \left\lfloor \frac{N_{sub-frame}^{UL,HF}(i)}{L} \right\rfloor.$$

$N_{SP}$ is the number of the switch points from downlink to uplink; the value of $N_{SP}$ equals to the number of UpPTSs.

For preamble format 0-3, the version number R can be determined through the PRACH configuration type transmitted to the mobile telephone by the base station according to the version number of the combination of preamble format and density in PRACH configuration aggregate;

For preamble format 4, $$R = \left\lfloor \frac{N_{RA}^{BW} \cdot N_{SP}}{D} \right\rfloor,$$

$N_{RA}^{BW}$ is number of the PRACH admissible by the frequency domain under current system bandwidth; or $$R = \min\left(\left\lfloor \frac{N_{RA}^{BW} \cdot N_{SP}}{D} \right\rfloor, 3\right);$$

or the version number R is determined through the PRACH configuration type transmitted to the mobile telephone by the base station according to the version number of the combination of preamble format and density in PRACH configuration aggregate.

For preamble format 0-3, the version number r can be obtained directly through the PRACH configuration type transmitted to the mobile telephone by the base station. For preamble format 4, $r=N_{ID}^{cell}$ mod R, or is obtained directly through the PRACH configuration type transmitted to the mobile telephone by the base station, wherein r∈[0, R−1].

The mapping result of the embodiment will be detailed hereafter by giving examples:

If R=1, D=4, the format of the PRACH is preamble format 4, D:U=1:3, then $N_{ind}^{RA}$=0, 1, . . . , 3 respectively correspond to (0, 0), (0, 1), (0, 2), (0, 3). $f_{RA}^0(0,0,0)$=0, 1 correspond to the two PRACHs mapped into the UpPTS of the first half frame and with the version number 0, and the corresponding relation can be random. For example, $f_{RA}^0(0,0,0)$=0, 1 can respectively correspond to (0, 0), (0, 2) or (0, 2), (0, 0). $f_{RA}^0(0,1,0)$=0, 1 correspond to the two PRACHs mapped into the UpPTS of the second half frame and with the version number 0, and the corresponding relation can be random. For example, $f_{RA}^0(0,1,0)$=0, 1 can respectively correspond to (0, 1), (0, 3) or (0, 3), (0, 1). $k'_{RA}$=0, the mapping results of the time and frequency locations are as shown in FIG. 6.

Figure 8:
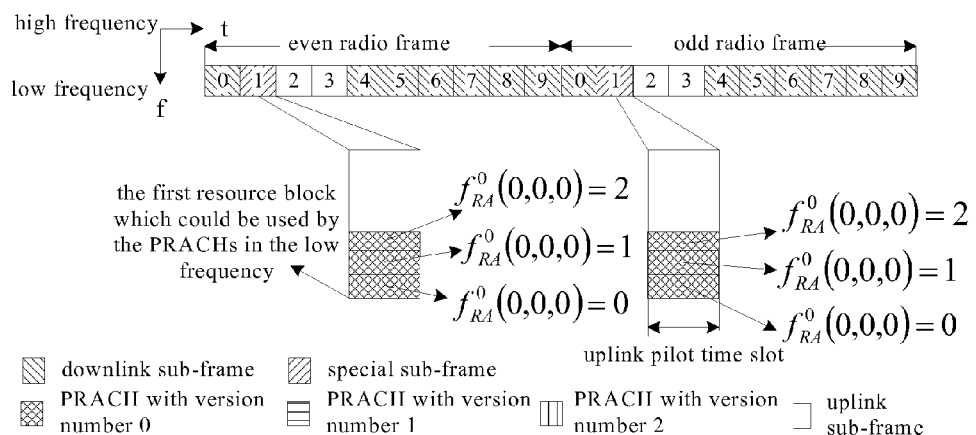
FIG. 8 shows Example 2 of the mapping result of the Embodiment 6.

If R=1, D=3, the format of the PRACH is preamble format 4, D:U=8:2 (one conversion point from uplink to downlink, namely $N_{SP}$=1), then $N_{ind}^{RA}$=0, 1, . . . , 2 respectively correspond to (0, 0), (0, 1), (0, 2). $f_{RA}^0(0,0,0)$=0, 1, 2 correspond to the three PRACHs with the version number 0, and the corresponding relation can be random. For example, $f_{RA}^0(0,0,0)$=0, 1, 2 can respectively correspond to (0, 0), (0, 1), (0, 2), and can also respectively correspond to (0, 0), (0, 2), (0, 1). $k'_{RA}$=0, the mapping results of the time and frequency locations are as shown in FIG. 8.

The Seventh Embodiment

Supposing that the density of the PRACH is D (D can take the values of 0.5, 1, 2, 3, 4, 5, 6 or 10 PRACH/10 ms); the version number is R; the serial number is $N_{ind}^{RA}$=0, 1, . . . , R⌈D⌉−1; the index of usable PRACH of a certain cell within one random access cycle is d (also known as PRACH index or density index in a cell, d=0, 1, . . . , ⌈D⌉−1); version number is r (r∈[0, R−1]); the number of the switch points from downlink to uplink in 10 ms radio frame is $N_{SP}$; and the number of certain format of PRACH received by the time domain in a half frame is $N_{RA}^{HF}(i)$.

PRACH numbering: the PRACHs are numbered according to the sequence of increasing the density index first, and then increasing the version number, namely $N_{ind}^{RA}$=r⌈D⌉+d, wherein $N_{ind}^{RA}$=0, 1, R⌈D⌉−1, d=0, 1, . . . , ⌈D⌉−1, r=0, 1, . . . , R−1.

Frequency Domain Mapping

For Preamble Format 0-4

The PRACHs with the same version number r and mapped into one uplink subframe or the UpPTS are mapped from low frequency to high frequency or from high frequency to low frequency in the frequency resource which can be used for transmitting the PRACHs. The two adjacent UpPTSs adopt different mapping sequences. One PRACH occupies 6 resource blocks, and the frequency bands occupied by two adjacent PRACHs in the frequency domain do not overlap. The same mapping process is adopted for each version number r. Specifically:

For the situation that one radio frame has two UpPTSs,

In the uplink subframe or UpPTS of the first half frame, the PRACHs are mapped from low frequency to high frequency in the frequency resource which could be used for transmitting the PRACHs; in the uplink subframe or UpPTS of the second half frame, the PRACHs are mapped from high frequency to low frequency in the frequency resource which can be used for transmitting the PRACHs;

For the situation that one radio frame has one UpPTS,

In the uplink subframes or UpPTSs of all radio frames, the PRACHs are mapped from low frequency to high frequency in usable frequency band.

The above mentioned mapping principle can be expressed by the following formula:

Frequency domain mapping formula:

For Preamble Format 0-4

$$k_{RA} = \begin{cases} k'_{RA} + 6f_{RA}^r(t_{RA}^0, t_{RA}^1, t_{RA}^2), & \text{if } t_{RA}^1 \bmod 2 = 0 \\ N_{RB}^{UL} - k'_{RA} - 6 - 6f_{RA}^r(t_{RA}^0, t_{RA}^1, t_{RA}^2), & \text{otherwise} \end{cases}$$

Wherein, $f_{RA}^r(t_{RA}^0, t_{RA}^1, t_{RA}^2)$ is the frequency domain mapping index (the serial number of the PRACH in frequency domain) of preamble format 0-3 PRACHs, and $f_{RA}^r(t_{RA}^0, t_{RA}^1, t_{RA}^2)$=0, 1, 2, . . . , $N_{RA}^r(t_{RA}^0, t_{RA}^1, t_{RA}^2)$−1; Its meaning is the serial numbers of all the PRACHs which have the version number r and are in the same time domain location determined by the parameter $(t_{RA}^0, t_{RA}^1, t_{RA}^2)$; $k'_{RA}$ is the first resource block (RB) which can be used by the PRACHs in the low frequency ($k'_{RA}$∈[0, $N_{RB}^{UL}$−6]); $N_{RA}^r(t_{RA}^0, t_{RA}^1, t_{RA}^2)$ is the number of all the PRACHs which have the version number r and are in the same time domain location determined by the parameter $(t_{RA}^0, t_{RA}^1, t_{RA}^2)$.

$t_{RA}^1$ equals to 0 or 1, therefore $t_{RA}^1$ mod 2=0 is equivalent to $t_{RA}^1$=0; and $t_{RA}^1$ mod 2=1 is equivalent to $t_{RA}^1$=1;

For preamble format 0-3 PRACHs, L is the number of the uplink subframes occupied by the preamble format 0-3 PRACHs; $N_{sub-frame}^{UL,HF}(i)$ the number of the uplink subframes in a half frame; for preamble format 4, L=1, $N_{sub-frame}^{UL,HF}(i)$ is the number (1 or 0) of UpPTS in a half frame; i=0 refers to the first half frame, and i=1 refers to the second half frame, and $$N_{RA}^{HF}(i) = \left\lfloor \frac{N_{sub\text{-}frame}^{UL,HF}(i)}{L} \right\rfloor.$$

$N_{SP}$ is the number of the switch points from downlink to uplink; the value of $N_{SP}$ equals to the number of UpPTSs.

For preamble format 0-3, the version number R can be determined through the PRACH configuration type transmitted to the mobile telephone by the base station according to the version number of the combination of preamble format and density in PRACH configuration aggregate;

For preamble format 4, $$R = \left\lfloor \frac{N_{RA}^{BW} \cdot N_{SP}}{D} \right\rfloor,$$

$N_{RA}^{BW}$ is number of the PRACH admissible by the frequency domain under current system bandwidth; or $$R = \min\left(\left\lfloor \frac{N_{RA}^{BW} \cdot N_{SP}}{D} \right\rfloor, 3\right);$$

or the version number R is determined through the PRACH configuration type transmitted to the mobile telephone by the base station according to the version number of the combination of preamble format and density in PRACH configuration aggregate.

For preamble format 0-3, the version number r can be obtained directly through the PRACH configuration type transmitted to the mobile telephone by the base station. For preamble format 4, $r = N_{ID}^{cell} \mod R$, or is obtained directly through the PRACH configuration type transmitted to the mobile telephone by the base station, wherein r c[0, R−1].

The Eighth Embodiment

Supposing that the density of the PRACH is D (D can take the values of 0.5, 1, 2, 3, 4, 5, 6 or 10 PRACH/10 ms); the version number is R; the serial number is $N_{ind}^{RA}=0, 1, \ldots, R\lceil D\rceil−1$; the index of usable PRACH of certain cell within one random access cycle is d (also known as PRACH index or density index in a cell, $d=0, 1, \ldots, \lceil D\rceil−1$); version number is r ($r\in[0, R−1]$); the number of the switch points from downlink to uplink in 10 ms radio frame is $N_{SP}$; and the number of certain format of PRACH received by the time domain in a half frame is $N_{RA}^{HF}(i)$.

PRACH numbering: the PRACHs are numbered according to the sequence of increasing the density index first, and then increasing the version number, namely $N_{ind}^{RA}=r\lceil D\rceil+d$, wherein $N_{ind}^{RA}=0, 1, R \lceil D\rceil−1, d=0, 1, \ldots, \lceil D\rceil−1, r=0, 1, \ldots, R−1$.

Frequency Domain Mapping
For Preamble Format 0-4

The PRACHs with the same version number r and mapped into one uplink subframe or the UpPTS are mapped from low frequency to high frequency or from high frequency to low frequency in the frequency resource which can be used for transmitting the PRACHs. The two adjacent UpPTSs adopt different mapping sequences. One PRACH occupies 6 resource blocks, and the frequency bands occupied by two adjacent PRACHs in the frequency domain do not overlap. The same mapping process is adopted for each version number r. Specifically:

For the situation that one radio frame has two UpPTSs,

In the uplink subframe or UpPTS of the first half frame, the PRACHs are mapped from low frequency to high frequency in the frequency resource which could be used for transmitting the PRACHs; in the uplink subframe or UpPTS of the second half frame, the PRACHs are mapped from high frequency to low frequency in the frequency resource which can be used for transmitting the PRACHs;

For the situation that one radio frame has one UpPTS,

In the uplink subframes or UpPTSs of all radio frames, the PRACHs are mapped from two sides to the middle in usable frequency band.

The above mentioned mapping principle can be expressed by the following formulas:
Frequency domain mapping formulas:
For Preamble Format 0-4
When $N_{SP}=2$, $$k_{RA} = \begin{cases} k'_{RA} + 6f_{RA}^r(t_{RA}^0, t_{RA}^1, t_{RA}^2), & \text{if } t_{RA}^1 \mod 2 = 0 \\ N_{RB}^{UL} - k'_{RA} - 6 - 6f_{RA}^r(t_{RA}^0, t_{RA}^1, t_{RA}^2), & \text{otherwise} \end{cases}$$

When $N_{SP} = 1$, $$k_{RA} = \begin{cases} k'_{RA} + 6\left\lfloor \frac{f_{RA}^r(t_{RA}^0, t_{RA}^1, t_{RA}^2)}{2} \right\rfloor, & f_{RA}^r(t_{RA}^0, t_{RA}^1, t_{RA}^2) \mod 2 = 0 \\ N_{RB}^{UL} - 6 - k'_{RA} - 6\left\lfloor \frac{f_{RA}^r(t_{RA}^0, t_{RA}^1, t_{RA}^2)}{2} \right\rfloor, & \text{otherwise} \end{cases}$$

Wherein,
$f_{RA}^r(t_{RA}^0, t_{RA}^1, t_{RA}^2)$ is the frequency domain mapping index (the serial number of the PRACH in frequency domain) of preamble format 0-3 PRACHs, and $f_{RA}^r(t_{RA}^0, t_{RA}^1, t_{RA}^2)=0, 1, 2, \ldots, N_{RA}^r(t_{RA}^0, t_{RA}^1, t_{RA}^2)−1$; Its meaning is the serial numbers of all the PRACHs which have the version number r and are in the same time domain location determined by the parameter $(t_{RA}^0, t_{RA}^1, t_{RA}^2)$; $k'_{RA}$ is the first resource block (RB) which can be used by the PRACHs in the low frequency ($k'_{RA}\in[0, N_{RB}^{UL}−6]$); $N_{RA}^r(t_{RA}^0, t_{RA}^1, t_{RA}^2)$ is the number of all the PRACHs which have the version number r and are in the same time domain location determined by the parameter $(t_{RA}^0, t_{RA}^1, t_{RA}^2)$.

$t_{RA}^1$ equals to 0 or 1, therefore $t_{RA}^1 \mod 2=0$ is equivalent to $t_{RA}^1=0$; and $t_{RA}^1 \mod 2=1$ is equivalent to $t_{RA}^1=1$;

For preamble format 0-3 PRACHs, L is the number of the uplink subframes occupied by the preamble format 0-3 PRACHs; $N_{sub\text{-}frame}^{UL,HF}(i)$ the number of the uplink subframes in a half frame; for preamble format 4, L=1, $N_{sub\text{-}frame}^{UL,HF}(i)$ is the number (1 or 0) of UpPTS in a half frame; i=0 refers to the first half frame, and i=1 refers to the second half frame, and $$N_{RA}^{HF}(i) = \left\lfloor \frac{N_{sub\text{-}frame}^{UL,HF}(i)}{L} \right\rfloor.$$

$N_{SP}$ is the number of the switch points from downlink to uplink; the value of $N_{SP}$ equals to the number of UpPTSs.

For preamble format 0-3, the version number R can be determined through the PRACH configuration type transmitted to the mobile telephone by the base station according to the version number of the combination of preamble format and density in PRACH configuration aggregate;

For preamble format 4, $$R = \left\lfloor \frac{N_{RA}^{BW} \cdot N_{SP}}{D} \right\rfloor,$$

$N_{RA}^{BW}$ is number of the PRACH admissible by the frequency domain under current system bandwidth; or $$R = \min\left(\left\lfloor \frac{N_{RA}^{BW} \cdot N_{SP}}{D} \right\rfloor, 3\right);$$

or the version number R is determined through the PRACH configuration type transmitted to the mobile telephone by the base station according to the version number of the combination of preamble format and density in PRACH configuration aggregate.

For preamble format 0-3, the version number r can be obtained directly through the PRACH configuration type transmitted to the mobile telephone by the base station. For preamble format 4, $r = N_{ID}^{cell} \mod R$, or is obtained directly through the PRACH configuration type transmitted to the mobile telephone by the base station, wherein $r \in [0, R-1]$.

The Ninth Embodiment

It is assumed that the density of the PRACH is D (D can be 0.5, 1, 2, 3, 4, 5, 6 or 10 PRACH/10 ms); the number of version is R; the serial number is $N_{ind}^{RA} = 0, 1, \ldots, R\lceil D \rceil - 1$; the index of usable PRACH in a random access period for a certain cell is d (which can be referred to as intra-cell or density index in a cell, $d = 0, 1, \ldots, \lceil D \rceil - 1$); the version number is r ($r \in [0, R-1]$); the number of downlink-to-uplink conversion points in a 10 ms radio frame is $N_{SP}$; the number of the of the PRACHs of a certain format contained in a half frame in the time domain is $N_{RA}^{HF}(i)$.

PRACH numbering: upon numbering, the density index is first incremented, then the version number is incremented, i.e., $N_{ind}^{RA} = r\lceil D \rceil + d$, wherein $N_{ind}^{RA} = 0, 1, \ldots, R\lceil D \rceil - 1$, $d = 0, 1, \ldots, \lceil D \rceil - 1$, $r = 0, 1, \ldots, R-1$.

Frequency Domain Mapping
For Preamble Format 0-3

The PRACHs with the same time domain location and version number r are mapped from two sides to the middle in the frequency resource which can be used for transmitting the PRACHs.

It assumed that there are W PRACHs with the same time domain location and version number r, and the serial numbers of the PRACHs are respectively $w = 0, 1, 2, \ldots, W-1$, then the mapping method is: the PRACHs with even number w are mapped from low frequency to high frequency in the usable frequency band, while there could be used for transmitting the PRACHs according to sequence of w from small to big; and if w is odd number, the PRACHs are mapped from high frequency to low frequency in the frequency resource which could be used for transmitting the PRACHs according to sequence of w from small to big, wherein one PRACH occupies 6 resource blocks, and the frequency bands occupied by two adjacent PRACHs in the frequency domain do not overlap with each other; the same mapping process is adopted for each version number r.

For Preamble Format 4

The PRACHs with the same version number r and mapped into a certain UpPTS are mapped from low frequency to high frequency or from high frequency to low frequency in the frequency resource which can be used for transmitting the PRACHs. The two adjacent UpPTSs adopt different mapping sequences. One PRACH occupies 6 resource blocks, and the frequency bands occupied by two adjacent PRACHs in the frequency domain do not overlap. The same mapping process is adopted for each version number r. Specifically:

For the situation that one radio frame has two UpPTSs,
In the UpPTS of the first half frame, the PRACHs are mapped from low frequency to high frequency in frequency resource which could be used for transmitting the PRACHs; in the UpPTS of the second half frame, the PRACHs are mapped from high frequency to low frequency in frequency resource which could be used for transmitting the PRACHs;

For the situation that one radio frame has one UpPTS,
In the UpPTSs of all radio frames, the PRACHs are mapped from two sides to the middle in usable frequency band.

The above mentioned mapping principle can be expressed by the following formulas:
Frequency domain mapping formulas:
For Preamble Format 0-4
In the UpPTS of even numbered radio frames, the PRACHs are mapped from low frequency to high frequency in frequency resource which could be used for transmitting the PRACHs; in the UpPTS of odd numbered radio frames, the PRACHs are mapped from high frequency to low frequency in frequency resource which can be used for transmitting the PRACHs.

The above-mentioned mapping principle can be expressed by the following formulas:
Frequency domain mapping formulas:
For preamble format 0-3 PRACHs, $$k_{RA} = \begin{cases} k'_{RA} + 6\left\lfloor \frac{f^r_{RA}(t^0_{RA}, t^1_{RA}, t^2_{RA})}{2} \right\rfloor, & \text{if } f^r_{RA}(t^0_{RA}, t^1_{RA}, t^2_{RA}) \mod 2 = 0 \\ N^{UL}_{RB} - k'_{RA} - 6 - 6\left\lfloor \frac{f^r_{RA}(t^0_{RA}, t^1_{RA}, t^2_{RA})}{2} \right\rfloor, & \text{otherwise} \end{cases}$$

For preamble format 4 PRACH,
When $N_{SP} = 2$, $$k_{RA} = \begin{cases} k'_{RA} + 6 f^r_{RA}(t^0_{RA}, t^1_{RA}, t^2_{RA}), & \text{if } t^1_{RA} \mod 2 = 0 \\ N^{UL}_{RB} - k'_{RA} - 6 - 6 f^r_{RA}(t^0_{RA}, t^1_{RA}, t^2_{RA}), & \text{otherwise} \end{cases}$$

When $N_{SP} = 1$, $$k_{RA} = \begin{cases} k'_{RA} + 6\left\lfloor \frac{f^r_{RA}(t^0_{RA}, t^1_{RA}, t^2_{RA})}{2} \right\rfloor, & f^r_{RA}(t^0_{RA}, t^1_{RA}, t^2_{RA}) \mod 2 = 0 \\ N^{UL}_{RB} - 6 - k'_{RA} - 6\left\lfloor \frac{f^r_{RA}(t^0_{RA}, t^1_{RA}, t^2_{RA})}{2} \right\rfloor, & \text{otherwise} \end{cases}$$

Wherein,
$f_{RA}^r(t_{RA}^0, t_{RA}^1, t_{RA}^2)$ is the frequency domain mapping index (the serial number of the PRACH in frequency domain) of preamble format 0-3 PRACHs, and $f_{RA}^r(t_{RA}^0, t_{RA}^1, t_{RA}^2) = 0, 1, 2, \ldots, N_{RA}^r(t_{RA}^0, t_{RA}^1, t_{RA}^2) - 1$; Its meaning is the serial numbers of all the PRACHs which have the version number r and are in the same time domain location determined by the parameter $(t_{RA}^0, t_{RA}^1, t_{RA}^2)$; $k'_{RA}$ is the first resource block (RB) which could be used by the PRACHs in the low frequency ($k'_{RA} \in [0, N_{RB}^{UL}-6]$); $N_{RA}^r(t_{RA}^0, t_{RA}^1, t_{RA}^2)$ is the number of all the PRACHs which have the version number r and are in the same time domain location determined by the parameter ($t_{RA}^0, t_{RA}^1, t_{RA}^2$).

$t_{RA}^1$ equals to 0 or 1, therefore $t_{RA}^1 \bmod 2=0$ is equivalent to $t_{RA}^1=0$; and $t_{RA}^1 \bmod 2=1$ is equivalent to $t_{RA}^1=1$;

For preamble format 0-3 PRACHs, L is the number of the uplink subframes occupied by the preamble format 0-3 PRACHs; $N_{sub-frame}^{UL,HF}(i)$ the number of the uplink subframes in a half frame; for preamble format 4, L=1, $N_{sub-frame}^{UL,HF}(i)$ is the number (1 or 0) of UpPTS in a half frame; i=0 refers to the first half frame, and i=1 refers to the second half frame, and $$N_{RA}^{HF}(i) = \left\lfloor \frac{N_{sub-frame}^{UL,HF}(i)}{L} \right\rfloor.$$

$N_{SP}$ is the number of the switch points from downlink to uplink; the value of $N_{SP}$ equals to the number of UpPTSs.

For preamble format 0-3, the version number R can be determined through the PRACH configuration type transmitted to the mobile telephone by the base station according to the version number of the combination of preamble format and density in PRACH configuration aggregate;

For preamble format 4, $$R = \left\lfloor \frac{N_{RA}^{BW} \cdot N_{SP}}{D} \right\rfloor,$$

$N_{RA}^{BW}$ is the number of the PRACH admissible by the frequency domain under current system bandwidth; or $$R = \min\left(\left\lfloor \frac{N_{RA}^{BW} \cdot N_{SP}}{D} \right\rfloor, 3\right);$$

or the version number R is determined through the PRACH configuration type transmitted to the mobile telephone by the base station according to the version number of the combination of preamble format and density in PRACH configuration aggregate.

For preamble format 0-3, the version number r can be obtained directly through the PRACH configuration type transmitted to the mobile telephone by the base station. For preamble format 4, $r=N_{ID}^{cell} \bmod R$, or is obtained directly through the PRACH configuration type transmitted to the mobile telephone by the base station, wherein $r \in [0, R-1]$.

As seen from above mentioned description, the method for physical random access channels according to the embodiments of the present invention considers the version number factor during mapping, overcomes the problems that the PRACHs processed by the same base station are non-uniformly distributed in the time domain and so on, enables uniformly distributing the PRACHs which require to be processed by the same base station in the time domain, and decreasing the inter-cell interference of the second type PRACH to the utmost extent at the same time.

Obviously, those skilled in the art shall understand that the above mentioned modules and steps of the present invention can be realized by using general purpose calculating device, can be integrated in one calculating device or distributed on a network which consists of a plurality of calculating devices. Alternatively, the modules and the step of the present invention can be realized by using the executable program code of the calculating device. Consequently, the modules and the steps can be stored in the storage device and executed by the calculating device, or the modules and the steps are made into integrated circuit module respectively, or a plurality of modules or steps thereof are made into one integrated circuit module. In this way, the present invention is not restricted to any particular hardware and software combination.

The descriptions above are only preferable embodiments of the present invention, which are not used to restrict the present invention. For those skilled in the art, the present invention may have various changes and variations. Any amendments, equivalent substitutions, improvements etc. within the spirit and principle of the present invention are all concluded in the scope of protection of the present invention.

What is claimed:

1. A method for mapping Physical Random Access Channels, PRACHs, comprising the following steps:
   initiating from a mobile terminal or a base station,
   mapping the PRACHs in the same time domain location from low frequency to high frequency, or from high frequency to low frequency in usable frequency resource, wherein one PRACH occupies 6 continuous resource blocks, and the frequency bands occupied by two adjacent PRACHs in the frequency domain do not overlap; or
   mapping the PRACHs in the same time domain location from two sides to the middle in usable frequency resource, one PRACH occupies 6 continuous resource blocks, and the frequency bands occupied by two adjacent PRACHs in the frequency domain do not overlap.

2. The method according to claim 1, wherein there are W PRACHs belong to the same cell which have the version number r and are in the same time domain location, the serial number of the W PRACHs are respectively w=0, 1, 2, . . . , W−1, the step of mapping the W PRACHs which have the same time domain location and same version number from two sides to the middle in usable frequency resource specifically comprises:
   mapping the PRACHs with even serial number w from high frequency to low frequency in usable frequency resource according to the sequence of the w from small to big or from big to small, and mapping the PRACHs with odd serial number w from low frequency to high frequency in usable frequency resource according to the sequence of the w from small to big or from big to small; or
   if w is an even number, mapping the PRACHs with a w which is an even number from low frequency to high frequency in usable frequency resource according to the sequence of the w from small to big or from big to small, mapping the PRACHs with odd serial number w from high frequency to low frequency in usable frequency resource according to the sequence of the w from small to big or from big to small; or
   mapping the first half of PRACHs from high frequency to low frequency in usable frequency resource according to the sequence of the w from small to big or from big to small, and mapping the second half of PRACHs from low frequency to high frequency in usable frequency resource according to the sequence of the w from small to big or from big to small; or
   mapping the first half of PRACHs from low frequency to high frequency in usable frequency resource according to the sequence of the w from small to big or from big to small, and mapping the second half of PRACHs from high frequency to low frequency in usable frequency resource according to the sequence of the w from small to big or from big to small, wherein the PRACHs with the w≦[W/2] or w<[W/2] or w≦[W/2] or w<[W/2] are taken as the first half, and the rest PRACHs are taken as the second half.

3. The method according to claim 2, wherein the frequency domain mapping formula for performing mapping in the frequency domain is:

$$k_{RA} = \begin{cases} k'_{RA} + 6\left\lfloor \frac{f^r_{RA}(t^0_{RA}, t^1_{RA}, t^2_{RA})}{2} \right\rfloor, & f^r_{RA}(t^0_{RA}, t^1_{RA}, t^2_{RA}) \bmod 2 = 0 \\ N^{UL}_{RB} - 6 - k'_{RA} - 6\left\lfloor \frac{f^r_{RA}(t^0_{RA}, t^1_{RA}, t^2_{RA})}{2} \right\rfloor, & \text{otherwise} \end{cases}$$

wherein, $k_{RA}$ denotes the first usable frequency domain resource block of a certain PRACH, and $k^{RA} \in [0, N_{RB}^{UL} - 6]$, $N_{RB}^{UL}$ is the total number of uplink resource blocks; $f_{Ra}^r(t_{RA}^0, t_{RA}^1, t_{RA}^2)$ denotes the frequency domain mapping index of the PRACHs, and $f_{RA}^r(t_{RA}^0, t_{RA}^1, t_{RA}^2) = 0, 1, 2, \ldots, N_{RA}^r(t_{RA}^0, t_{RA}^1, t_{RA}^2) - 1$; which represents the serial numbers of all PRACHs belonging to the same cell, with the version number r and the same time domain location determined by the parameter ($t_{RA}^0$, $t_{RA}^1$, $t_{RA}^2$), $k'_{RA}$ is the serial number of the first resource block which can be used by the PRACHs in the low frequency, $k'_{RA} \in [0, N_{RB}^{UL} - 6]$;

$N_{RA}^r(t_{RA}^0, t_{RA}^1, t_{RA}^2)$ is the number of all the PRACHs belonging to the same cell, with the version number r and the same time domain location which is determined by the parameter ($t_{RA}^0$, $t_{RA}^1$, $t_{RA}^2$);

$N_{RB}^{UL}$ denotes the total number of the resource blocks corresponding to uplink bandwidth;

$t_{RA}^0$ is used to indicate in which radio frame the PRACH resides;

$t^1_{RA}$ is used to indicate in which half frame the PRACH resides;

$t^2_{RA}$ is used to indicate in which subframe in the half frame the PRACH resides.

4. The method according to claim 2, wherein the method also comprises the step of obtaining the version number r during using a mapping algorithm, the step comprises:

obtaining the version number r directly from the configuration type transmitted by the base station; or obtaining cell number $N_{ID}^{cell}$, setting the version number $r = N_{ID}^{cell} \bmod R$, and $r \in [0, R-1]$.

5. The method according to claim 1, wherein mapping PRACHs from low frequency to high frequency or from high frequency to low frequency in usable frequency resource specifically comprises:

for the PRACHs belong to the same cell which have the version number r and are in the same time domain location, under the condition that one radio frame has two uplink pilot time slots, mapping from low frequency to high frequency in usable frequency band in the uplink subframe or uplink pilot time slot or the subframe comprising the uplink pilot time slot in the first half frame, mapping from high frequency to low frequency in usable frequency band in the uplink subframe or uplink pilot time slot in the second half frame, all of the radio frames use the same method; or mapping from high frequency to low frequency in usable frequency band in the uplink subframe or uplink pilot time slot or the subframe comprising the uplink pilot time slot in the first half frame, mapping from low frequency to high frequency in usable frequency band in the uplink subframe or uplink pilot time slot in the second half frame, all of the radio frames use the same method;

under the condition that one radio frame has one uplink pilot time slot, mapping from low frequency to high frequency in usable frequency band in the uplink subframe or uplink pilot time slot or the subframe comprising the uplink pilot time slot in even numbered radio frames, mapping from high frequency to low frequency in usable frequency band in the uplink subframe or uplink pilot time slot or the subframe comprising the uplink pilot time slot in odd numbered radio frames; or mapping from low frequency to high frequency in usable frequency band in the uplink subframe or uplink pilot time slot or the subframe comprising the uplink pilot time slot in odd numbered radio frames, mapping from high frequency to low frequency in usable frequency band in the uplink subframe in even numbered radio frames; or mapping from low frequency to high frequency in usable frequency band in the uplink subframes or uplink pilot time slots or the subframes comprising the uplink pilot time slot in all of the radio frames; or mapping from high frequency to low frequency in usable frequency band in the uplink subframes or uplink pilot time slots or the subframes comprising the uplink pilot time slot in all of the radio frames; or mapping from two sides to the middle in usable frequency band in the uplink subframes or uplink pilot time slots or the subframes comprising the uplink pilot time slot in all of the radio frames.

6. The method according to claim 5, for the format of the PRACHs are preamble format 4, wherein the frequency domain mapping formula for performing mapping in the frequency domain is one of the following formulas:

$$k_{RA} = \begin{cases} k'_{RA} + 6f^r_{RA}(t^0_{RA}, t^1_{RA}, t^2_{RA}), & \text{if } ((SFN \bmod 2) \cdot (2 - N_{SP}) + t^1_{RA}) \bmod 2 = 0 \\ N^{UL}_{RB} - k'_{RA} - 6 - 6f^r_{RA}(t^0_{RA}, t^1_{RA}, t^2_{RA}), & \text{otherwise} \end{cases};$$

$$k_{RA} = \begin{cases} k'_{RA} + 6f^r_{RA}(t^0_{RA}, t^1_{RA}, t^2_{RA}), & \text{if } ((SFN \bmod 2) + t^1_{RA}) \bmod 2 = 0 \\ N^{UL}_{RB} - k'_{RA} - 6 - 6f^r_{RA}(t^0_{RA}, t^1_{RA}, t^2_{RA}), & \text{otherwise} \end{cases};$$

$$k_{RA} = \begin{cases} k'_{RA} + 6f^r_{RA}(t^0_{RA}, t^1_{RA}, t^2_{RA}), & \text{if } t^1_{RA} \bmod 2 = 0 \\ N^{UL}_{RB} - k'_{RA} - 6 - 6f^r_{RA}(t^0_{RA}, t^1_{RA}, t^2_{RA}), & \text{otherwise} \end{cases};$$

When $N_{SP} = 2$,

-continued $$k_{RA} = \begin{cases} k'_{RA} + 6f^r_{RA}(t^0_{RA}, t^1_{RA}, t^2_{RA}), & \text{if } t^1_{RA} \mod 2 = 0 \\ N^{UL}_{RB} - k'_{RA} - 6 - 6f^r_{RA}(t^0_{RA}, t^1_{RA}, t^2_{RA}), & \text{otherwise} \end{cases},$$

When $N_{SP} = 1$, $$k_{RA} = \begin{cases} k'_{RA} + 6\left\lfloor \frac{f^r_{RA}(t^0_{RA}, t^1_{RA}, t^2_{RA})}{2} \right\rfloor, & f^r_{RA}(t^0_{RA}, t^1_{RA}, t^2_{RA}) \mod 2 = 0 \\ N^{UL}_{RB} - 6 - k'_{RA} - 6\left\lfloor \frac{f^r_{RA}(t^0_{RA}, t^1_{RA}, t^2_{RA})}{2} \right\rfloor, & \text{otherwise;} \end{cases}.$$

wherein, $k_{RA}$ denotes the first usable frequency domain resource block of a certain PRACH, and $k_{RB} \in [0, N_{RB}^{UL}-6]$, $N_{RB}^{UL}$ is the total number of uplink resource blocks;

$f_{RA}^r(t_{RA}^0, t_{RA}^1, t_{RA}^2)$ is the frequency domain mapping index of the PRACHs, and $f_{RA}^r(t_{RA}^0, t_{RA}^1, t_{RA}^2)=0, 1, 2, \ldots, N_{RA}^r(t_{RA}^0, t_{RA}^1, t_{RA}^2)-1$; which represents the serial numbers of all the PRACHs belong to the same cell which have the version number r and are in the same time domain location determined by the parameter $(t_{RA}^0, t_{RA}^1, t_{RA}^2)$, $k'_{RA}$ denotes the serial number of the first resource block which can be used by the PRACHs in the low frequency, $k'_{RA} \in [0, N_{RB}^{UL}-6]$;

$N_{RA}^r(t_{RA}^0, t_{RA}^0, t_{RA}^2)$ is the number of all the PRACHs which have the version number r and are in the same time domain location determined by the parameter $(t_{RA}^0, t_{RA}^0, t_{RA}^2)$;

$N_{RB}^{UL}$ denotes the total number of the RBs corresponding to uplink bandwidth;

$N_{SP}$ is the number of the switch points from downlink to uplink in one radio frame;

$t_{RA}^0$ is used to indicate in which radio frame the PRACH resides;

$t_{RA}^1$ is used to indicate in which half frame the PRACH resides, $t_{RA}^1$ equals to 0 or 1 which respectively represents the PRACH is in the first half frame or the second half frame of the radio frame, therefore, $t_{RA}^1 \mod 2=0$ is equivalent to $t_{RA}^1=0$; and $t_{RA}^1 \mod 2=1$ is equivalent to $t_{RA}^1=1$;

$t_{RA}^2$ is used to indicate in which subframe in a half frame the PRACH resides;

SFN is the system frame number or is known as the radio frame number.

7. The method according to claim 5, wherein the method also comprises the step of obtaining the version number r during using a mapping algorithm, the step comprises:

obtaining the version number r directly from the configuration type transmitted by the base station; or obtaining cell number $N_{ID}^{cell}$, setting the version number $r=N_{ID}^{cell} \mod R$, and $r \in [0, R-1]$.

8. The method according to claim 1, wherein the method also comprises the step of obtaining the version number r during using a mapping algorithm, the step comprises:

obtaining the version number r directly from the configuration type transmitted by the base station; or obtaining cell number $N_{ID}^{cell}$, setting the version number $r=N_{ID}^{cell} \mod R$, and $r \in [0, R-1]$.

* * * * *